US012267882B2

(12) United States Patent
Zhao et al.

(10) Patent No.: US 12,267,882 B2
(45) Date of Patent: Apr. 1, 2025

(54) SRS-SWITCHING ENHANCEMENTS FOR MITIGATING THE IMPACT OF CONFLICT AND BLANKING

(71) Applicant: APPLE INC., Cupertino, CA (US)

(72) Inventors: Pengkai Zhao, Cupertino, CA (US); Dawei Zhang, Cupertino, CA (US); Edmund J. Stocks, Cupertino, CA (US); Fangli Xu, Beijing (CN); Haijing Hu, Cupertino, CA (US); Haitong Sun, Cupertino, CA (US); Jie Cui, Cupertino, CA (US); Madhusudan Chaudhary, Cupertino, CA (US); Rajesh Ambati, Cupertino, CA (US); Thanigaivelu Elangovan, Cupertino, CA (US); Wei Zeng, Cupertino, CA (US); Wen Zhao, Cupertino, CA (US); Yang Tang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 422 days.

(21) Appl. No.: 17/593,535

(22) PCT Filed: Oct. 15, 2020

(86) PCT No.: PCT/CN2020/121217
§ 371 (c)(1),
(2) Date: Sep. 20, 2021

(87) PCT Pub. No.: WO2022/077360
PCT Pub. Date: Apr. 21, 2022

(65) Prior Publication Data
US 2022/0312505 A1    Sep. 29, 2022

(51) Int. Cl.
*H04W 74/0833*    (2024.01)
*H04L 5/00*    (2006.01)

(52) U.S. Cl.
CPC ....... *H04W 74/0858* (2013.01); *H04L 5/0005* (2013.01); *H04L 5/0048* (2013.01)

(58) Field of Classification Search
CPC ............ H04W 74/0858; H04L 5/0005; H04L 5/0048; H04L 5/0051; H04L 5/001; H04L 5/0064
See application file for complete search history.

(56) References Cited

U.S. PATENT DOCUMENTS

| 2011/0170436 A1 | 7/2011 | Doan et al. |
| 2013/0329711 A1 | 12/2013 | Seo et al. |

(Continued)

FOREIGN PATENT DOCUMENTS

| CN | 110999176 A | 4/2020 |
| WO | 2018081597 A1 | 5/2018 |

(Continued)

OTHER PUBLICATIONS

3GPP TSG-RAN WG1 Meeting #86 R1-167716 Gothenburg, Sweden, Aug. 22-26, 2016 (Year: 2016).*

(Continued)

*Primary Examiner* — Sudesh M Patidar
(74) *Attorney, Agent, or Firm* — Dorsey & Whitney LLP

(57) ABSTRACT

Reporting potential impacts of sounding reference signal-switching (SRS-switching) to a base station may include determining that SRS-switching is to be performed by a UE. Based on determining that SRS-switching is to be performed, potential impacts to one or more of a plurality of radio access technologies (RATs) caused by performing SRS-switching while sharing radio frequency (RF) front-ends (RFFE) between at least a subset of the plurality of RATS may be processed. The potential impacts may comprise at least one of transmit-blanking (Tx-blanking) and receive-blanking (Rx-blanking) associated with one or more (Continued)

of the subset of RATs. A communication that indicates the potential impacts of SRS-switching may be encoded for transmission to a base station. The base station may also provide priority configurations for determining how to handle Tx-blanking, Rx-blanking, and SRS-skipping associated with SRS-switching.

18 Claims, 28 Drawing Sheets

(56) References Cited

U.S. PATENT DOCUMENTS

| | | | |
|---|---|---|---|
| 2014/0348100 A1 | 11/2014 | Ratasuk et al. | |
| 2018/0332544 A1 | 11/2018 | Chakraborty et al. | |
| 2019/0052328 A1* | 2/2019 | Akula | H04L 5/0048 |
| 2019/0159080 A1* | 5/2019 | Zhang | H04L 25/02 |
| 2019/0260487 A1 | 8/2019 | Kazmi et al. | |
| 2019/0305918 A1 | 10/2019 | Siomina et al. | |
| 2019/0319824 A1* | 10/2019 | Rico Alvarino | H04L 5/005 |
| 2020/0196331 A1* | 6/2020 | Rico Alvarino | H04L 5/0096 |
| 2020/0204316 A1* | 6/2020 | Zhang | H04L 5/0007 |
| 2020/0366407 A1* | 11/2020 | Lnu | H04L 1/0026 |
| 2021/0384949 A1* | 12/2021 | Kumar | H04W 76/15 |
| 2022/0069873 A1* | 3/2022 | Gopal | H04B 7/0469 |
| 2022/0116172 A1* | 4/2022 | Tang | H04L 5/0098 |
| 2022/0140975 A1* | 5/2022 | Siomina | H04L 5/0051 370/329 |

FOREIGN PATENT DOCUMENTS

| | | |
|---|---|---|
| WO | 2018083631 A1 | 5/2018 |
| WO | 2019032888 A1 | 2/2019 |
| WO | 2020076843 A1 | 4/2020 |

OTHER PUBLICATIONS

WIPO, International Search Report and Written Opinion, PCT/CN2020/121217, Jul. 14, 2021, 8 pages.

* cited by examiner

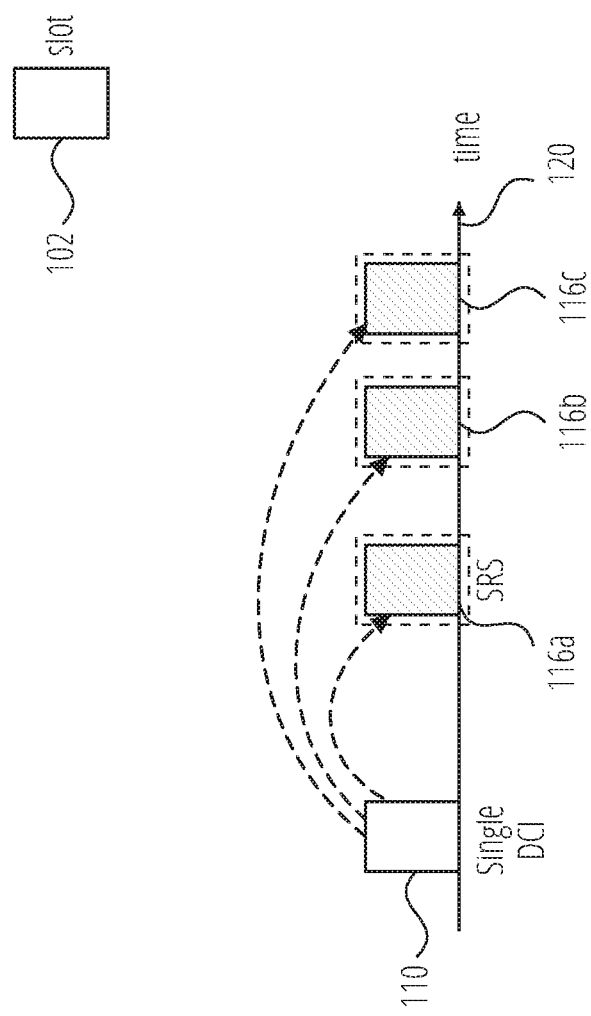

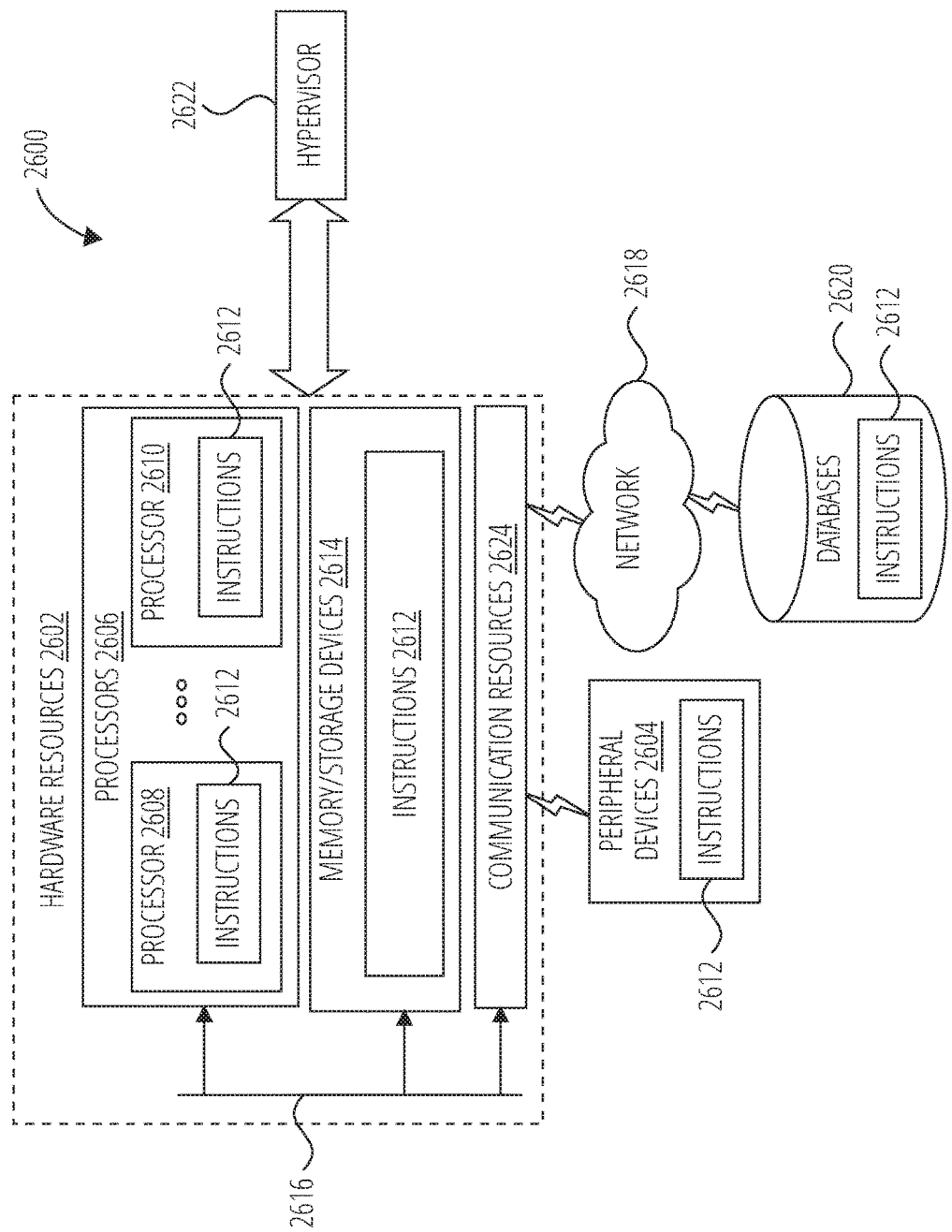

the figure number in which that element is first introduced.

SRS-SWITCHING ENHANCEMENTS FOR MITIGATING THE IMPACT OF CONFLICT AND BLANKING

TECHNICAL FIELD

This application relates generally to wireless communication systems, including sounding reference signal (SRS) switching (SRS-switching).

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) includes sub-6 GHz frequency bands, some of which are bands that may be used by previous standards, but may potentially be extended to cover potential new spectrum offerings from 410 MHz to 7125 MHz, Frequency Range 2 (FR2) includes frequency bands from 24.25 GHz to 52.6 GHz. Bands in the millimeter wave (mmWave) range of FR2 have shorter range but higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1C illustrates an example embodiment of a single DCI triggering multiple SRS resources or opportunities.

FIG. 26 illustrates components in accordance with one embodiment.

DETAILED DESCRIPTION

Figure 1A:
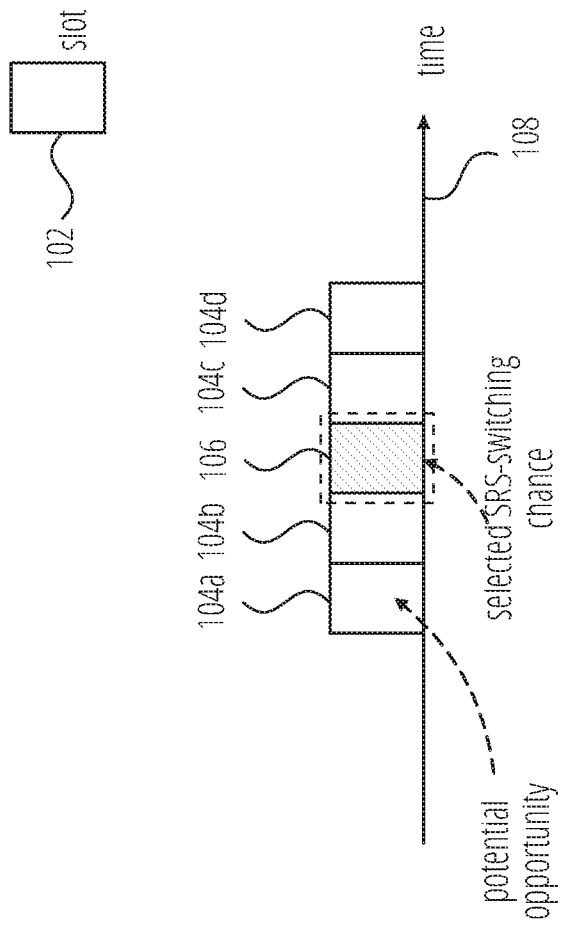
FIG. 1A illustrates an example embodiment of SRS-switching that can be delayed within a time-span window.

Sounding reference signal (SRS) switching (SRS-switching) in LTE/NR includes both SRS-antenna-switching and SRS-carrier-switching. The principles described herein may relate particularly to SRS-antenna-switching (also referred to as SRS transmit-port (Tx-port) switching) and as such, the use of the term SRS-switching may refer specifically to SRS-antenna-switching herein unless otherwise specified.

Notably, the principles described herein may allow for calibrating the uplink/downlink (UL/DL) multiple input and multiple output (MIMO) channel for better throughput performance. However, the principles described herein may also be applied to SRS-carrier-switching. In fact, with respect to SRS-carrier-switching, the principles described herein extend the key idea of antenna-switching to DL-only carriers that are without a paired uplink.

SRS-switching may include sweeping SRS signals across all downlink (DL) receive (Rx) antennas, at different symbols in the time-domain. SRS-switching includes different types as follows: a 1T2R; b. 1T4R; c. 2T4R; d. 1T1R; e. 2T2R; and f. 4T4R. "R" refers to a subset/set of receive antennas for PDSCH and "T" refers to the SRS antennas used for DL channel state information (CSI) acquisition.

When switching to an alternative Tx antenna with SRS-switching, there is a radio frequency (RF) re-configuration that occurs. If such re-configuration affects adjacent carriers/radio access technology (RAT) sharing the same configuration, those carriers/RAT will be interrupted even when they have no SRS-switching activity at that time.

Generally, an aggressor carrier's SRS-switching may cause interruption over a victim carrier when the two carriers' RF configuration is shared. For instance, the following scenarios may be applicable: 1. Interruption over carriers within the same RAT (i.e., intra-RAT), which includes the aggressor and victim carrier being within the same RAT and sharing all or part of their RF front-ends (RFFE)/antennas; 2. Interruption over carriers from different RAT (i.e., inter-RAT), which includes the aggressor and victim carriers being from different RATs, but sharing all or part of their RF front-ends (RFFE)/antennas; and 3. SRS switching over adjacent panel (FR2), which includes SRS switching to alternative panel potentially affecting on-going traffic (of carriers) using the current panel. Notably, conflict/blanking impacts due to SRS-switching are further discussed below.

To address the conflict impact, when a victim carrier (or RAT) is impacted by SRS-switching of an aggressor carrier (or RAT), there are two existing solutions that may be improved by the principles described herein: 1. SRS-skipping, which includes the aggressor carrier/RAT skipping its SRS-switching during conflicted symbols; and 2. Tx/Rx-blanking, which includes the victim carrier/RAT blanking the affected symbols in terms of Tx/Rx activities (referred to as Tx-blanking and Rx-blanking, respectively).

Notably, the impact of conflict/blanking may be exacerbated in 3G-PP Release 17 based on the following potential SRS enhancements that would make the SRS resource more flexible, but also much denser in the time domain: a SRS-antenna-switching for 6Rx and 8Rx UE's; b. SRS repetition; c. SRS time-bundling; and d. SRS coverage and flexibility.

In response to these issues, a number of detailed solutions are discussed herein. The first detailed solution includes reporting blanking statistics. The existing NR specification (i.e., 3GPP Release 16) indicates interruption from SRS-switching by specifying the affected band via fields in a UE's SRS-switching capability. However, the above-method is both tedious and inefficient. For instance, regarding such method, the following applies: 1. For each CA combo, there may exist multiple impacted bands to be reported (potentially involving multiple RATs), causing high over-head; and 2. It cannot describe the complete impact in terms of: a. Within the impacted band, which particular carrier or RAT is affected; b. For the affected carrier/RAT, the frequently at which it does get impacted; and c. Whether the impact is with respect to Tx-blanking, Rx-blanking, or both.

Accordingly, the first detailed solution is related to a LTE reporting the statistics of Tx-blanking and Rx-blanking that occur due to SRS-switching and includes the following two options: 1. The UE SRS-switching capability indicates whether it will be impacted by Tx/Rx-blanking due to shared RITE structure; and 2. The network (NW) can configure the UE to report the statistics of Tx/Rx-blanking caused by SRS-switching. With respect to the second option: a. The UE may collect blanking statistics from a given time-window, and report to the NW; b. The report granularity can be either per-carrier, or per-RAT; and c. The report cadence can be either periodic, or a-periodic (i.e., one-time triggering).

In an example, the following statistics could be utilized: 1. Regarding Tx-blanking: for the victim carrier/RAT, the UE may report the percentage of UL slots (or symbols) that are affected by Tx-blanking; 2. Regarding Rx-blanking: for the victim carrier/RAT, the UE may report the percentage of DL slots (or symbols) that are affected by Rx-blanking; and 3. Regarding SRS-Skipping: for the aggressor carrier/RAT, the UE may report the percentage of SRS-skippings (during SRS-switching) for avoiding blanking impact.

As briefly described herein, 3GPP Release 17 may include the provision of more opportunities (resources) for SRS-switching. Accordingly, the second detailed solution is related to such and referred to herein as multi-chance SRS-switching.

Figure 1B:
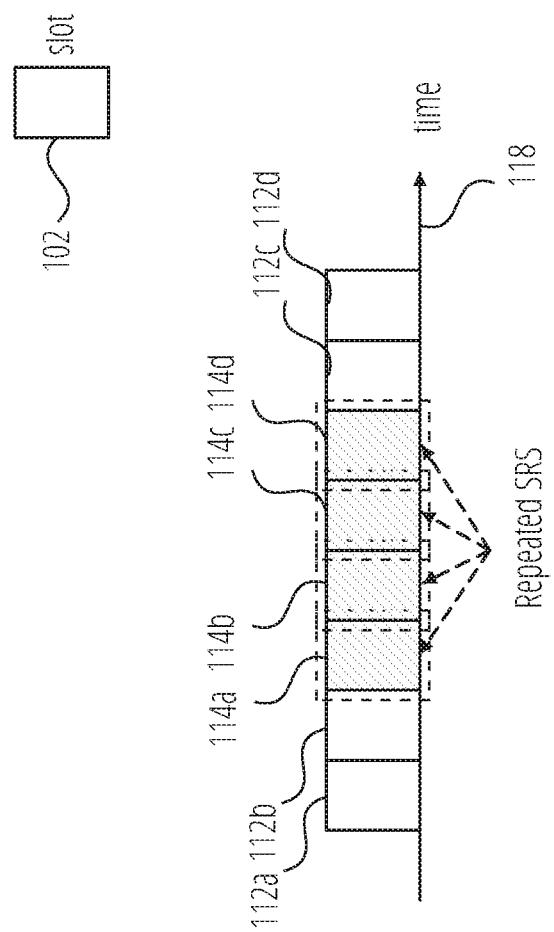
FIG. 1B illustrates an example embodiment of repeating SRS resources across multiple symbols or slots.

In particular, FIGS. 1A-1C include three scenarios as part of multi-chance SRS-switching: 1. FIG. 1A illustrates the first scenario (referred to herein as a time-span window), which includes SRS-switching that can be delayed within a time-span window 108 if it conflicts with traffic of a victim carrier/RAT. In particular, each rectangle comprises a slot (as represented by slot 102). In addition, candidate slots 104 (i.e., candidate slot 104a through candidate slot 104d) comprise slots in which the UE may potentially perform SRS-switching but refrains from doing so. Similarly, selected slot 106 comprises a slot in which the UE has selected to actually perform SRS-switching. In this way, a UE may delay SRS-switching during various slots within a time-span window and select a slot within the time-span window, which allows for avoiding conflicts with traffic of a victim carrier/RAT.

FIG. 1B illustrates the second scenario (referred to herein as repetition), which includes repeating SRS resources across multiple symbols or slots. Again, each rectangle comprises a slot (as represented by slot 102). In addition, candidate slots 112 (i.e., candidate slot 112a through candidate slot 112d) comprise slots in which the UE may repeat SRS resources across multiple slots (or symbols) in a window of time 118. Similarly, repeated SRS slots 114 (i.e., repeated SRS slot 114a through repeated SRS slot 114d) comprises slots (or symbols) in which SRS resources are repeated within the window of time 118.

FIG. 1C illustrates the third scenario (referred to herein as single DCI), which includes using a single DCI to trigger multiple SRS resources or opportunities. Again, each rectangle comprises a slot (as represented by slot 102) and the single DCI 110 is configured to trigger multiple SRS resources 116 (i.e., SRS resource 116a through SRS resource 116c) within a window of time 120.

Accordingly, the second detailed solution includes (as a first option), for multi-chance SRS-switching, the UE being allowed to skip a subset of opportunities if it will cause Tx/Rx-blanking impact over (on-going traffic of) the victim carrier/RAT As a second option, the second detailed solution includes the UE proactively determining the subset of opportunities for SRS-skipping. For instance, such determinations by the UE can be based on traffic priority of victim carrier/RAT, or based on NW rules specifically defined for multi-chance scenarios.

The third detailed solution is related to dynamic priority for SRS-skipping. More specifically, the NW may dynamically adjust the RAT priority used by UE to choose between SRS-skipping vs. Tx/Rx-blanking. Notably, the third detailed solution includes three options. The first option includes the NW being configured to adjust the priority of different RATs for the UE to choose between 1. SRS-skipping and 2. Tx/Rx-blanking. Such priority can be dynamic, and the NW can update priorities via RRC messaging, or MAC-CE.

In an example, if the victim RAT has on-going traffic that conflicts with the SRS-switching of an aggressor RAT then SRS-switching is skipped to protect the victim RAT when the victim RAT is configured with a higher priority. Otherwise, the SRS-switching opportunity is kept. In which case, Tx/Rx-blanking (over the victim RAT) are triggered.

The second option of the third detailed solution includes the UE using its local condition to derive its preferred priorities. Notably, the UE can update the NW with such preferred priority via a UE assistance information (UAI) channel. In an example, the UE's local conditions may include throughput, power consumption, thermal condition, and/or battery condition.

Figure 2:
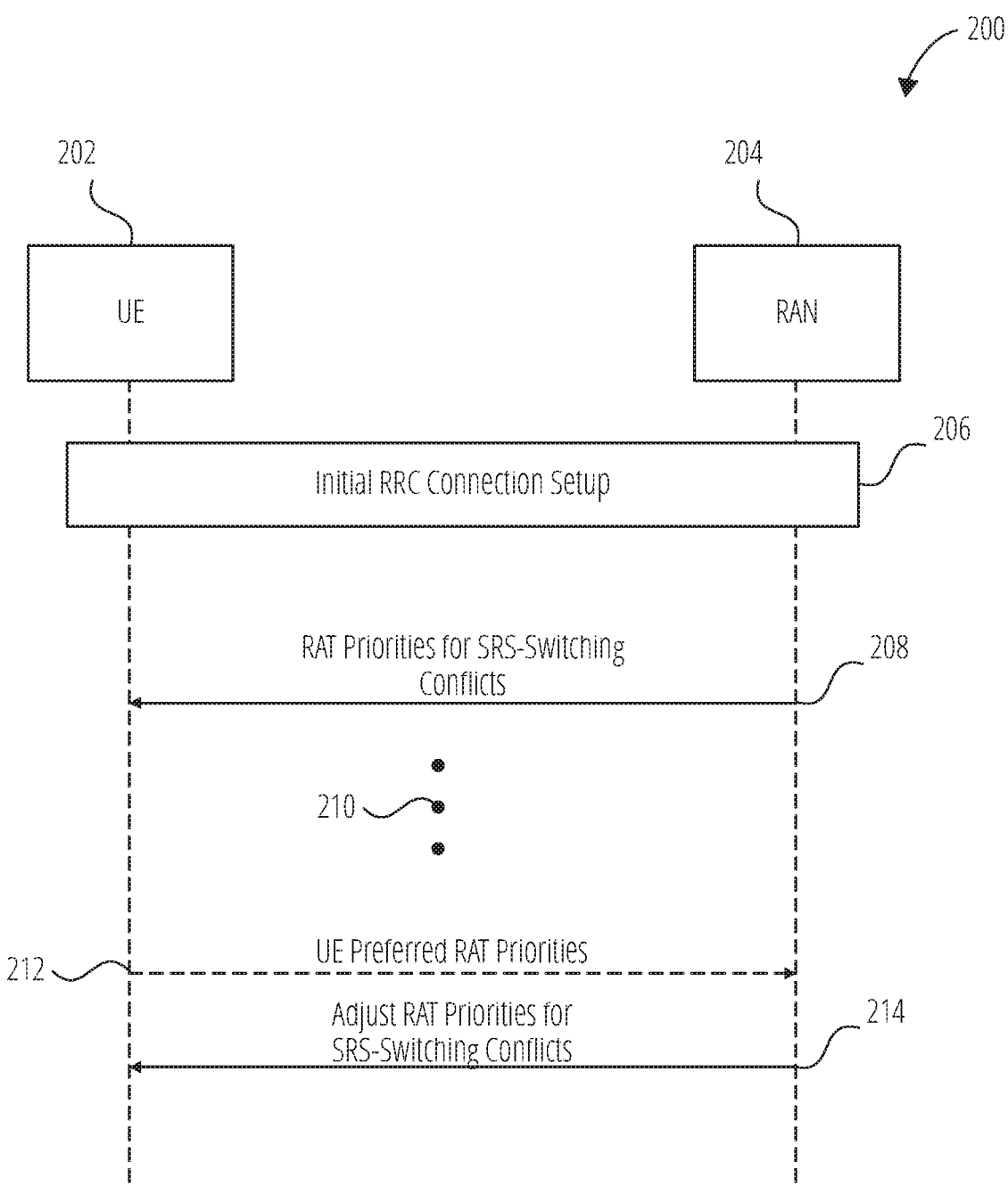
FIG. 2 illustrates a communication flowchart of updating priorities between a UE and a RAN.

FIG. 2 illustrates a communication flowchart 200 illustrating the update of priorities between a UE 202 and a RAN 204. In particular, the priority communication flow begins by performing an initial RRC connection setup 206. The RAN 204 may then provide the UE with RAT priorities associated with SRS-switching conflicts via communication 208. Ellipses 210 then illustrates that any number of other actions/communications may take place prior to the UE 202 responding to the RAN 204 with the UE's preferred RAT priorities via communication 212, as discussed above with respect to the second option of the third detailed solution. Finally, RAT priorities associated with SRS-switching conflicts may be adjusted in response to the UE's preferred RAT priorities via communication 214.

The third option of the third detailed solution includes a case where the UE can dynamically report its preferred SRS-switching config to the NW. The UE's preferred configuration may include: 1. Disabling/enabling SRS-switching over certain carriers; and 2. An SRS-switching configuration upgrade (e.g., from 1T2R to 1T4R) or downgrade (from 1T4R to 1T2R).

The fourth detailed solution is related to a time-bundling scenario in which the NW can trigger multiple SRS-switching configurations that are simultaneously active. In such cases, each of the configurations may have a different periodicity type periodic v.s. a-periodic) and time resource. Accordingly, the fourth solution is associated with allowing the NW to apply different priorities for those simultaneous configurations in terms of SRS-skipping v.s. Tx/Rx-blanking in such circumstances.

Again, the fourth detailed solution includes two options. The first option includes, for time-bundling SRS-switching, allowing the NW to apply different priorities for each configuration (associated with the tradeoff between SRS-skipping and Tx/Rx-blanking) when the NW triggers multiple different configurations that are simultaneously active.

Figure 3:
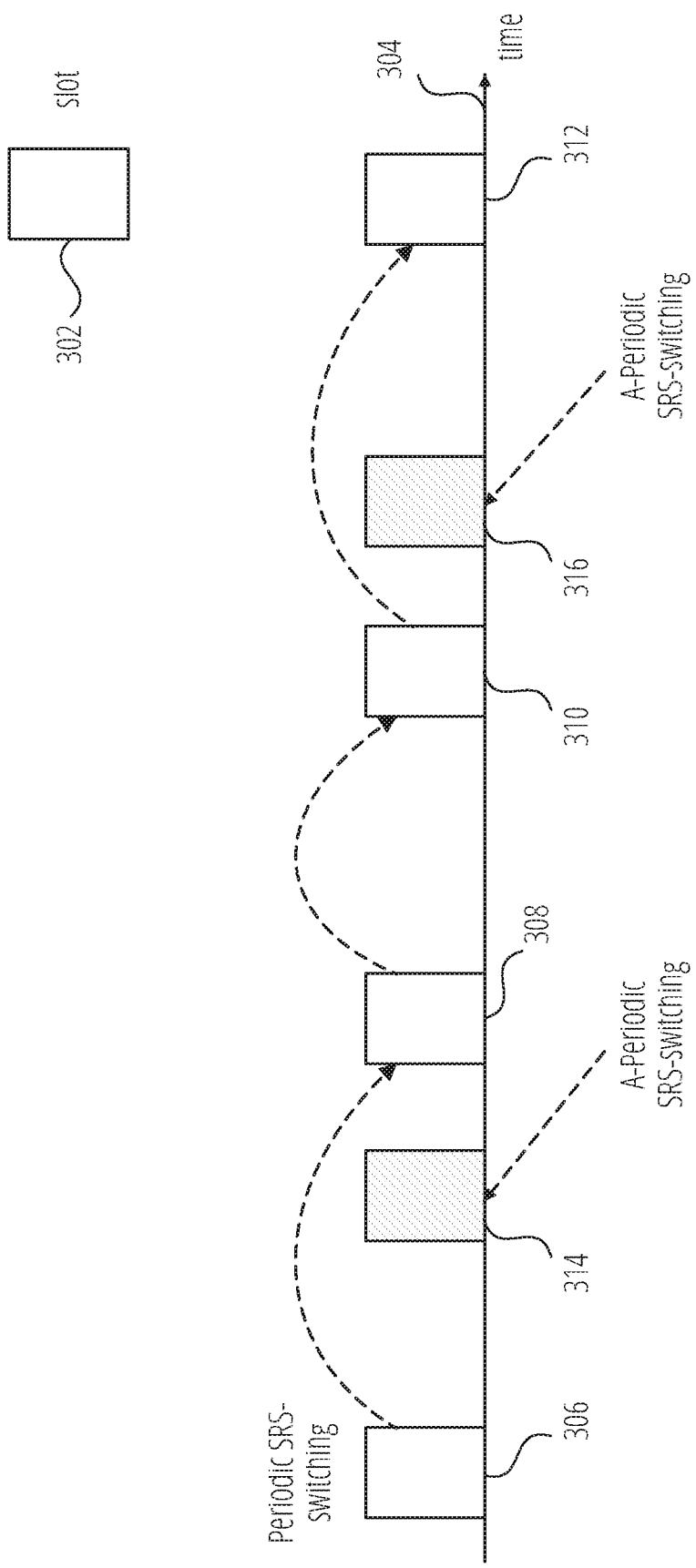
FIG. 3 illustrates an example embodiment of two active SRS-switching configurations with different periodicities.

FIG. 3 illustrates an example that includes two active SRS-switching configurations in which the first active SRS-switching configuration is periodic and the second active SRS-switching configuration is a-periodic. As shown in FIG. 3, each rectangle comprises a slot (as represented by slot 102) that is within a window of time 304. Further, FIG. 3 includes periodic SRS-switching resources (i.e., periodic SRS-switching resource 306 through periodic SRS-switching resource 312) and a-periodic SRS-switching resources (i.e., a-periodic SRS-switching resource 314 and a-periodic SRS-switching resource 316).

In a more specific example, assume that the NW activates one periodic SRS-switching resource with a long periodicity and another a-periodic SRS-switching resource with a shorter periodicity. As such, the periodic resource may track long-term channel conditions, while the a-periodic resource may capture short-term channel variation. In such a case, the periodic resource associated with the long term channel may have higher priority and may not be skipped. In contrast, the a-periodic resource may be best-effort, and therefore, may be skipped when causing Tx/Rx-blanking.

Accordingly, the second option associated with the fourth detailed solution may include an assumption that there are two active SRS-switching configurations in a time-bundling way, the first of which is a periodic resource while the second is a-periodic. The NW can thus configure the periodic SRS-switching resource with high priority for the long-term channel and configure the a-periodic SRS-switching resource to be skippable to avoid Tx/Rx-blanking.

As described herein, there are two choices for conflict mitigation: 1. SRS-skipping; and 2. Tx/Rx-blanking. Accordingly, the fifth detailed solution is related to utilizing a condition-based SRS-skipping logic. More specifically, the NW may configure and trigger a condition-based SRS-skipping. In response, the UE may monitor such condition(s) such that SRS is skipped when the condition is met. In an example, the potential conditions may include one or more of: 1. Link quality (e.g., reference signal receive power (RSRP), reference signal receive quality (RSRQ), signal-to-noise ratio (SNR), and so forth); 2. Scheduling ratio; 3. Throughput; and 4. Traffic-priority. Notably, the UF, may monitor these conditions and take any applicable subsequent action.

In a more particular example related to link quality, when the victim carrier's link quality (RSRP/RSRQ/SNR) is better than the aggressor carrier's link quality by a given threshold, then the aggressor carrier's SRS-switching may be skipped when conflicts occur. In an example related to scheduling ratio, when the victim carrier's scheduling ratio is higher than the aggressor carrier's by a particular threshold, the aggressor carrier's SRS-switching may be skipped when conflicts occur. In an example related to throughput, when the victim carrier's throughput is higher than the aggressor carrier's by a threshold, the aggressor carrier's SRS-switching may be skipped when conflicts occur. In an example related to traffic priority, when the victim carrier's traffic priority is higher than the aggressor carrier's, the aggressor carrier's SRS-switching may be skipped when conflicts occur (see the *Traffic Priority:* 3GPP QCI table, Table 6.1.7-A: Standardized QCI characteristics).

Figure 4:
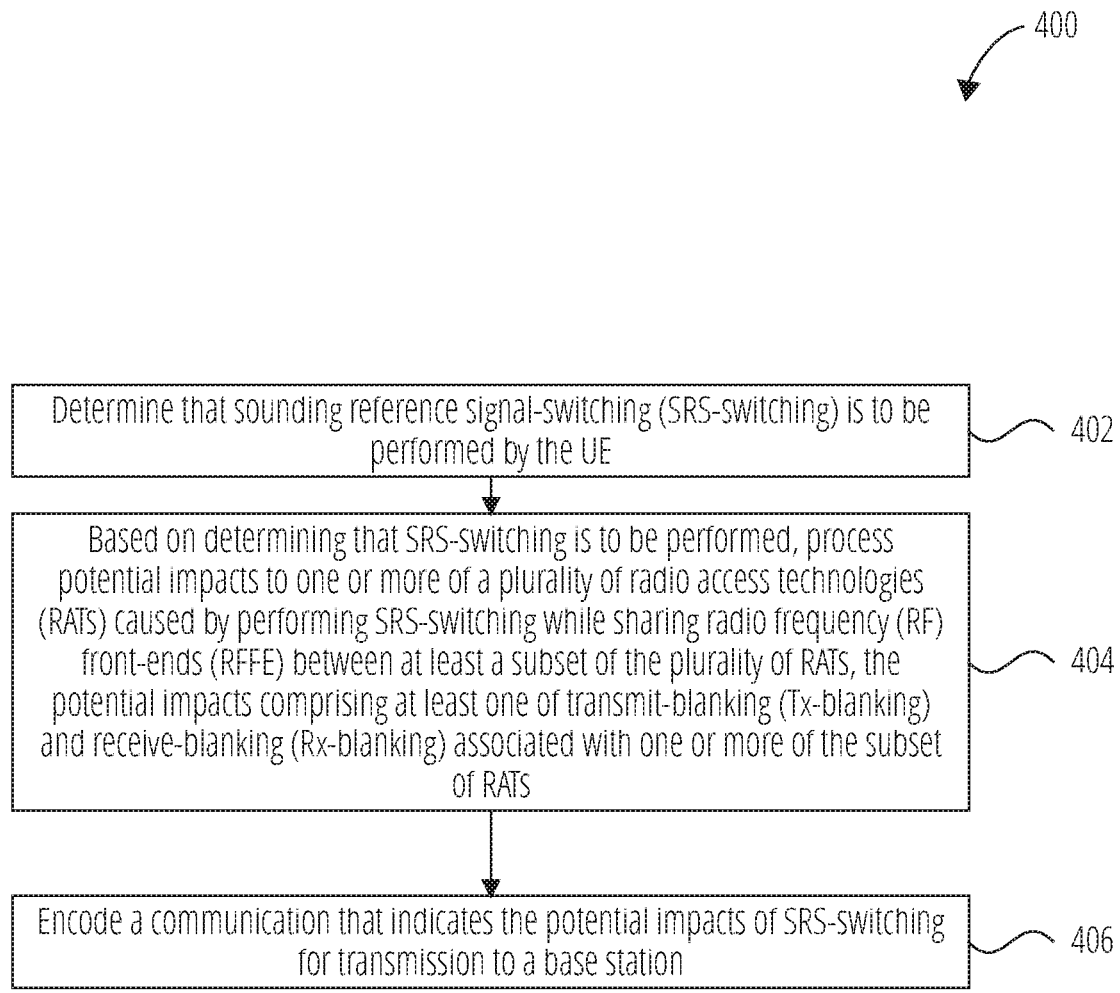
FIG. 4 illustrates a flowchart of a method for reporting potential impacts of SRS-switching to a base station.

FIG. 4 illustrates a flowchart of a method 400 for reporting potential impacts of SRS-switching to a base station. In block 402, the method 400 determines that sounding reference signal-switching (SRS-switching) is to be performed by the UE. In block 404, the method 400, based on determining that SRS-switching is to be performed, processes potential impacts to one or more of a plurality of radio access technologies (RATs) caused by performing SRS-switching while sharing radio frequency (RF) front-ends (RFFE) between at least a subset of the plurality of RATs. For instance, the potential impacts may comprise at least one of transmit-blanking (Tx-blanking) and receive-blanking (Rx-blanking) associated with one or more of the subset of RATs. Accordingly, the potential impacts may be determined with respect to effects on particular RATs. In block 406, the method 400 encodes a communication that indicates the potential impacts of SRS-switching for transmission to a base station. In particular, the UE may encode a communication that indicates potential impacts associated with one or more RATs.

Figure 5:
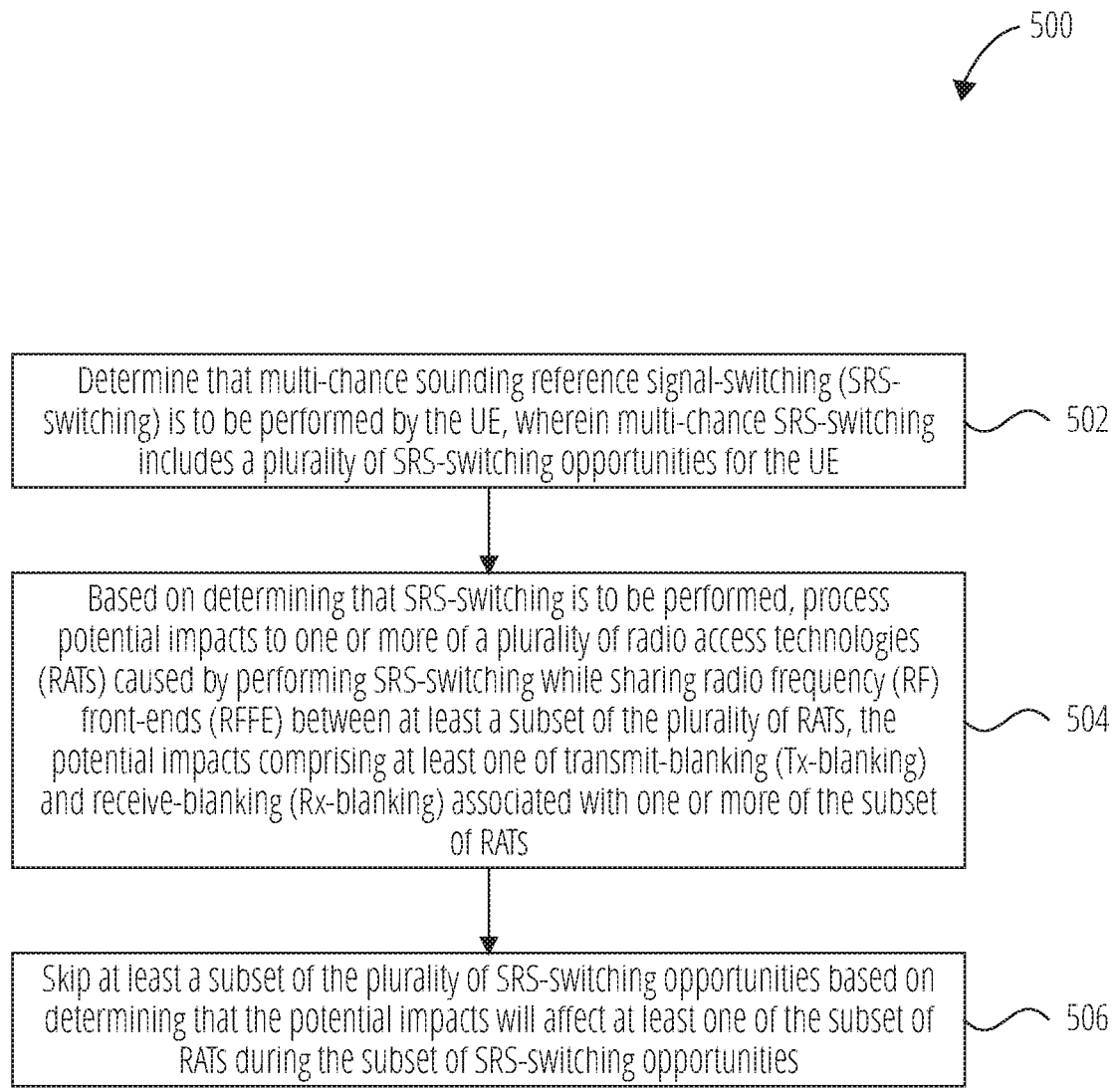
FIG. 5 illustrates a flowchart of a method for multi-chance SRS-switching.

FIG. 5 illustrates a flowchart of a method 500 for multi-chance SRS-switching. In block 502, the method 500 determines that multi-chance sounding reference signal-switching (SRS-switching) is to be performed by the UE. For instance, multi-chance SRS-switching may include creating a plurality of SRS-switching opportunities for the UE. In a more particular example, multi-chance SRS-switching may comprise time-span window, repetition, or single DCI, as further described herein.

In block 504, the method 500, based on determining that SRS-switching is to be performed, processes potential impacts to one or more of a plurality of radio access technologies (RATs) caused by performing SRS-switching while sharing radio frequency (RF) front-ends (RFFE) between at least a subset of the plurality of RATs. For instance, the potential impacts may comprise at least one of transmit-blanking (Tx-blanking) and receive-blanking (Rx-blanking) associated with one or more of the subset of RATs. In block 506, the method 500 skips at least a subset of the plurality of SRS-switching opportunities based on determining that the potential impacts will affect at least one of the subset of RATs during the subset of SRS-switching opportunities. For instance, the UE may skip one or more SRS-switching opportunities based on determining that such opportunities will result in Tx-blanking and/or Rx-blanking associated with one or more RATs.

Figure 6:
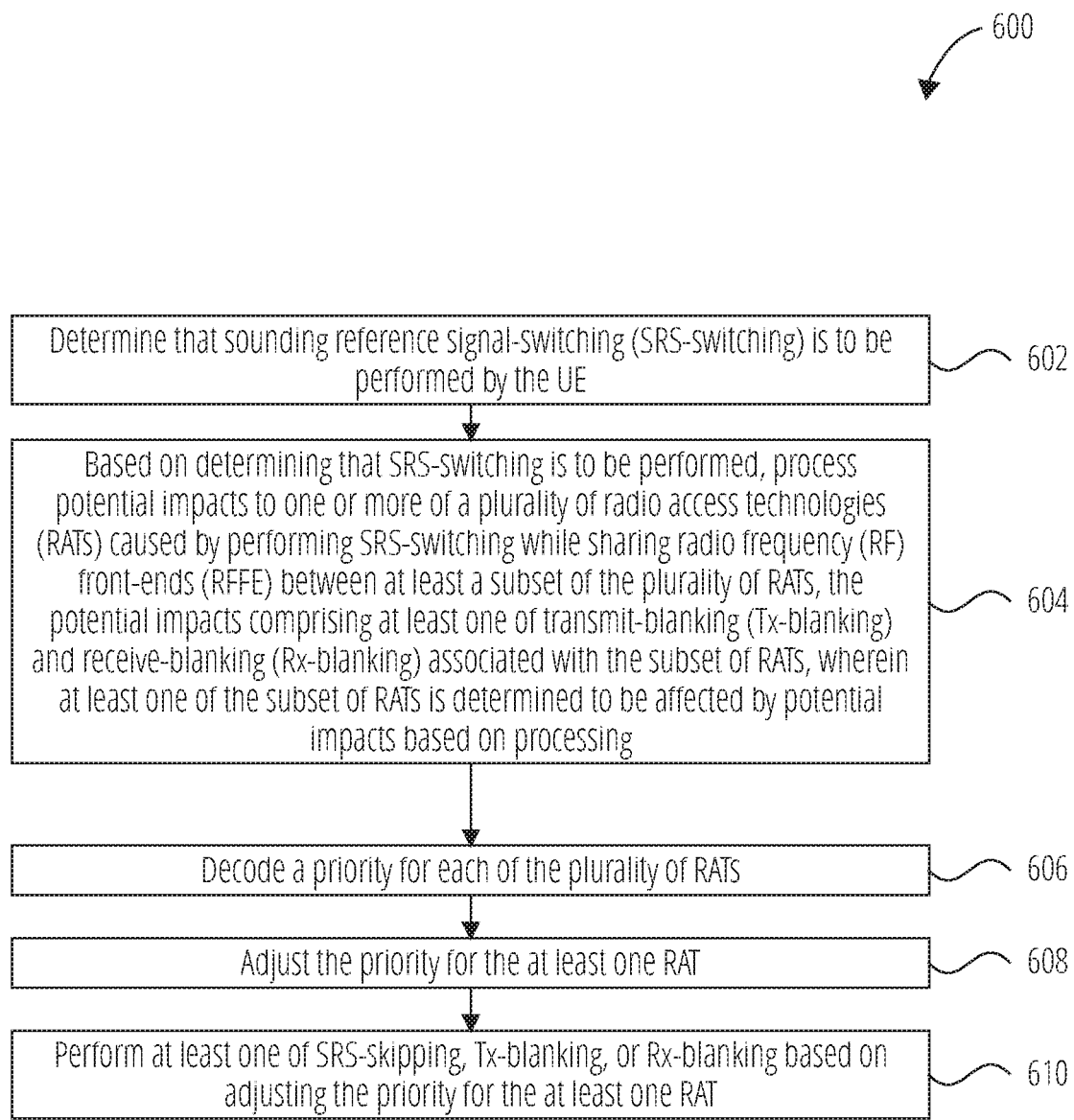
FIG. 6 illustrates a flowchart of a method for adjusting priorities associated with RATs for SRS-skipping.

FIG. 6 illustrates a flowchart of a method 600 for adjusting priorities associated with RATs for SRS-skipping. In block 602, the method 600 determines that sounding reference signal-switching (SRS-switching) is to be performed by the UE. In block 604, the method 600, based on determining that SRS-switching is to be performed, processes potential impacts to one or more of a plurality of radio access technologies (RATs) caused by performing SRS-switching while sharing radio frequency (IU) front-ends (RFFE) between at least a subset of the plurality of RATs. For instance, the potential impacts may comprise at least one of transmit-blanking (Tx-blanking) and receive-blanking (Rx-blanking) associated with the subset of RATs. In addition, at least one of the subset of RATs may be determined to be affected by potential impacts during processing.

In block 606, the method 600 decodes a priority for each of the plurality of RATs. For instance, some RATS may have a higher priority than other RATs such that SRS-skipping may be more likely when a RAT having a higher priority will be affected by SRS-switching in comparison to RAT having a lower priority. In block 608, the method 600 adjusts the priority for the at least one RAT. For instance, the priority may be adjusted by the UE in response to an adjustment by the base station or by the UE without triggering such adjustment by the base station. In block 610, the method 600 performs at least one of SRS-skipping, Tx-blanking, or Rx-blanking based on adjusting the priority for the at least one RAT. For instance, SRS-skipping may be performed with respect to a certain opportunity based on adjusting a priority to a RAT (i.e., to a higher priority) that would otherwise be affected by performing SRS-switching.

Figure 7:
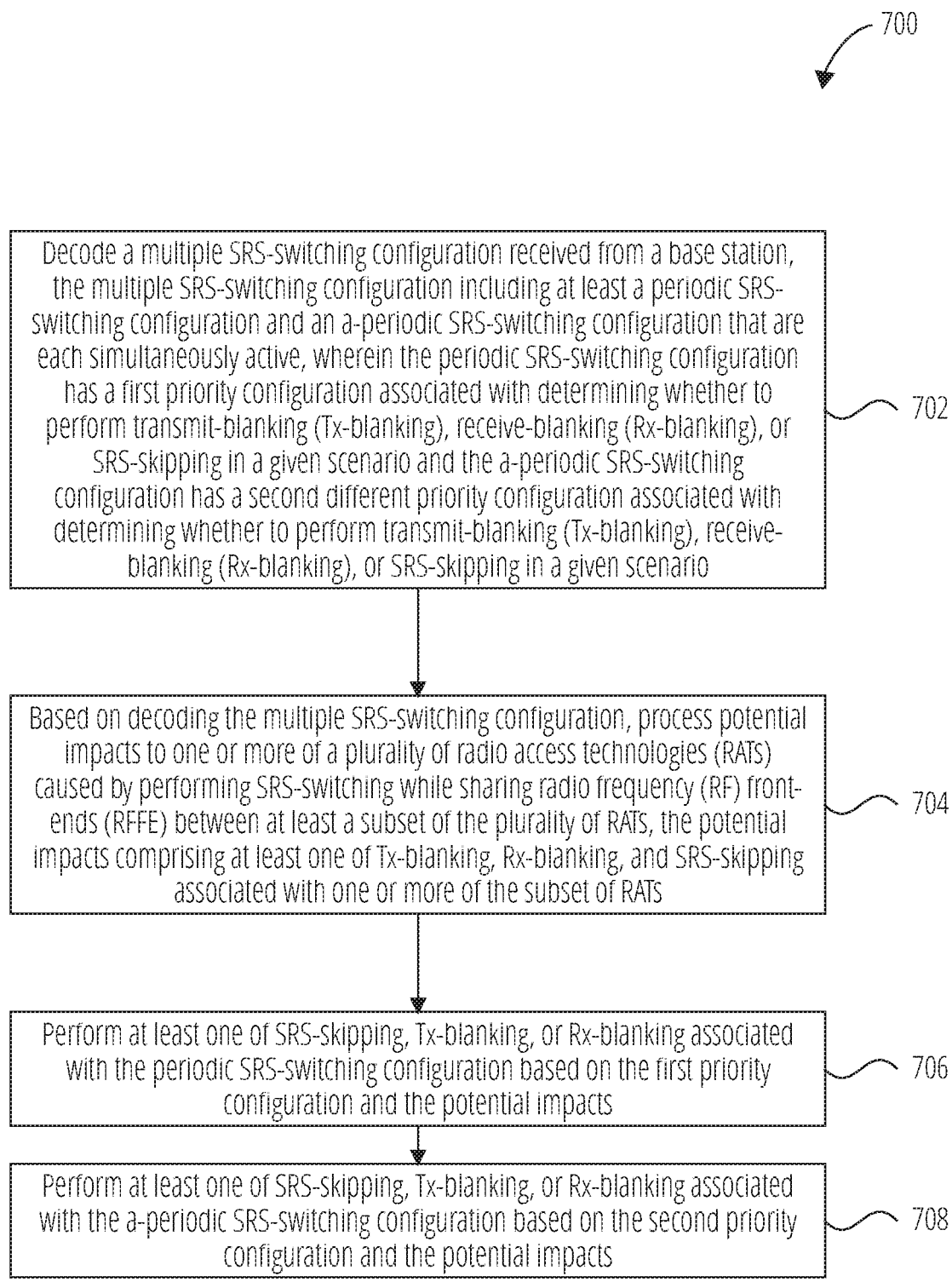
FIG. 7 illustrates a flowchart of a method for time-bundling based SRS-switching.

FIG. 7 illustrates a flowchart of a method 700 for time-bundling based SRS-switching. In block 702, the method 700 decodes a multiple SRS-switching configuration received from a base station. For instance, the multiple SRS-switching configuration may include at least a periodic SRS-switching configuration and an a-periodic SRS-switching configuration that are each simultaneously active. In addition, the periodic SRS-switching configuration may have a first priority configuration associated with determining whether to perform transmit-blanking (Tx-blanking), receive-blanking (Rx-blanking), or SRS-skipping in a given scenario and the a-periodic SRS-switching configuration may have a second different priority configuration associated with determining whether to perform transmit-blanking (Tx-blanking), receive-blanking (Rx-blanking), or SRS-skipping in a given scenario.

In block 704, the method 700, based on decoding the multiple SRS-switching configuration, processes potential impacts to one or more of a plurality of radio access technologies (RATs) caused by performing SRS-switching while sharing radio frequency (RF) front-ends (RFFE) between at least a subset of the plurality of RATs. For instance, the potential impacts may comprise at least one of Tx-blanking, Rx-blanking, and SRS-skipping associated with one or more of the subset of RATs. In block 706, the method 700 performs at least one of SRS-skipping, Tx-blanking, or Rx-blanking associated with the periodic SRS-switching configuration based on the first priority configuration and the potential impacts. For instance, based on the potential impacts and the first priority being associated with a long-term channel, Tx-blanking and/or Rx-blanking may be performed. In block 708, the method 700 performs at least one of SRS-skipping, Tx-blanking, or Rx-blanking associated with the a-periodic SRS-switching configuration based on the second priority configuration and the potential impacts. For instance, based on the potential impacts and the second priority being associated with a best-efforts, short-term channel, SRS-skipping may be performed.

Figure 8:
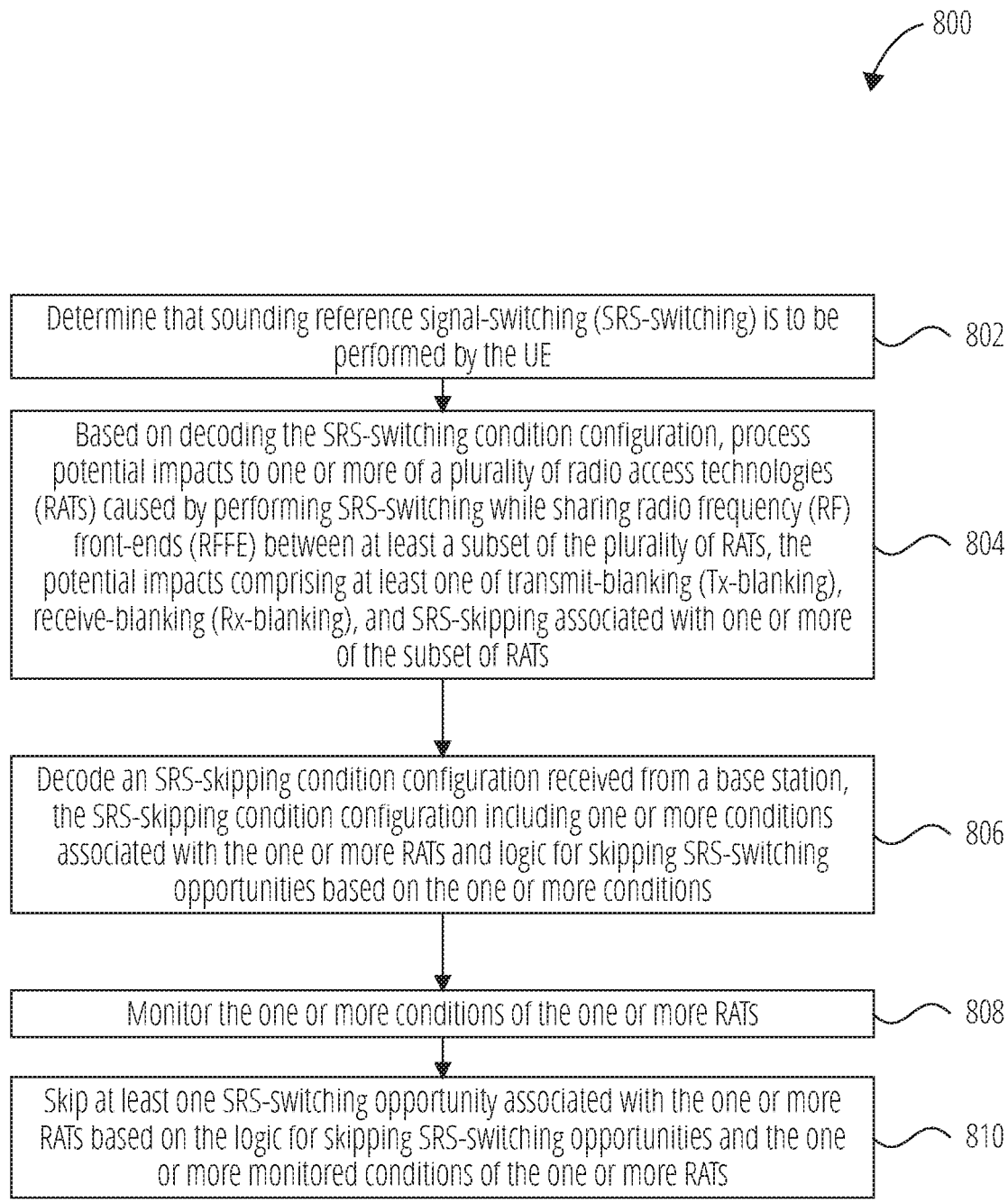
FIG. 8 illustrates a flowchart of a method for conditional SRS-skipping.

FIG. 8 illustrates a flowchart of a method 800 for conditional SRS-skipping. In block 802, the method 800 determines that sounding reference signal-switching (SRS-switching) is to be performed by the UE. In block 804, the method 800, based on decoding the SRS-switching condition configuration, processes potential impacts to one or more of a plurality of radio access technologies (RATs) caused by performing SRS-switching while sharing radio frequency (RE) front-ends (RFFE) between at least a subset of the plurality of RATs. For instance, the potential impacts may comprise at least one of transmit-blanking (Tx-blanking), receive-blanking (Rx-blanking), and SRS-skipping associated with one or more of the subset of RATs.

In block 806, the method 800 decodes an SRS-skipping condition configuration received from a base station. For example, the SRS-skipping condition configuration may include one or more conditions associated with the one or more RATs and logic for skipping SRS-switching opportunities based on the one or more conditions. In block 808, the method 800 monitors the one or more conditions of the one or more RATs. For instance, the one or more conditions may comprise link quality, scheduling ratio, throughput, and/or traffic priority. In block 810, the method 800 skips at least one SRS-switching opportunity associated with the one or more RATs based on the logic for skipping SRS-switching opportunities and the one or more monitored conditions of the one or more RATs. In an example, when a victim carrier's link quality (RSRP, RSRQ, SNR, and so forth) is better than an aggressor carrier's by a given threshold, then the aggressor carrier's SRS-switching may be skipped when a conflict occurs.

The following examples in FIGS. 9-20 illustrate inter-RAT interruption due to SRS-switching. Notably, the EN-DC case (LTE+NR) is used as the typical example. It should be noted that, for the intra-RAT inter-carrier case, a similar impact/analysis can be applied, but details are omitted for simplicity.

Figure 9:
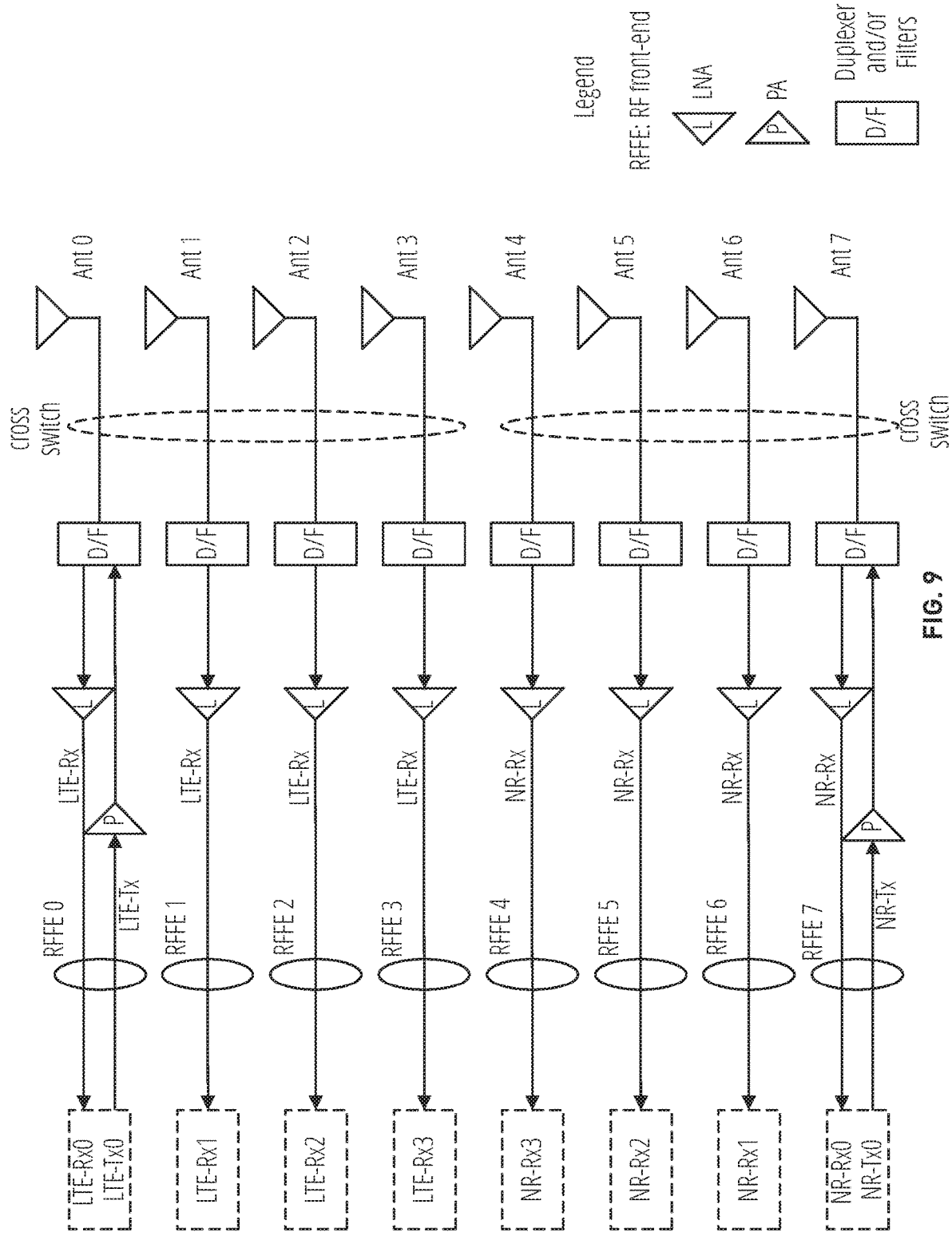
FIG. 9 illustrates an example embodiment of LTE and NR RATs/carriers equipped with completely independent RF front-ends (RFFEs).

FIG. 9 illustrates an example of LTE+NR that are both 1Tx/4Rx and are equipped with completely independent RIF front-end (RFFE). When LTE and NR are equipped with independent RF front-ends, then SRS-switching of one RAT will not interrupt the other RAT.

Figure 10:
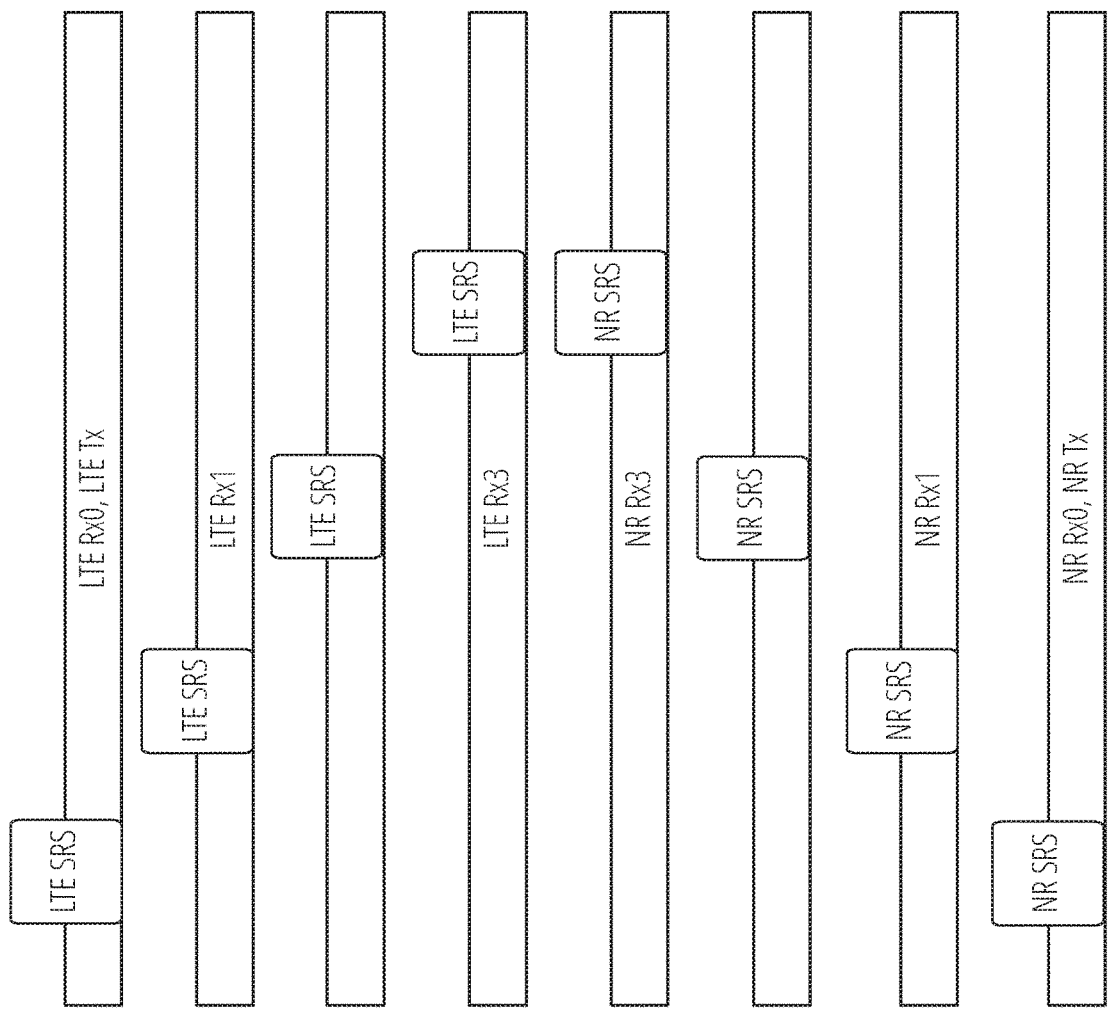
FIG. 10 illustrates an example embodiment of LTE and NR RATs/carriers equipped with completely independent RF front-ends (RFFEs).

FIG. 10 illustrates another example (similar to FIG. 9) of LTE+NR that are equipped with completely independent RF front-end. In such cases, no conflict/blanking impact will occur, as further described herein.

Figure 11:
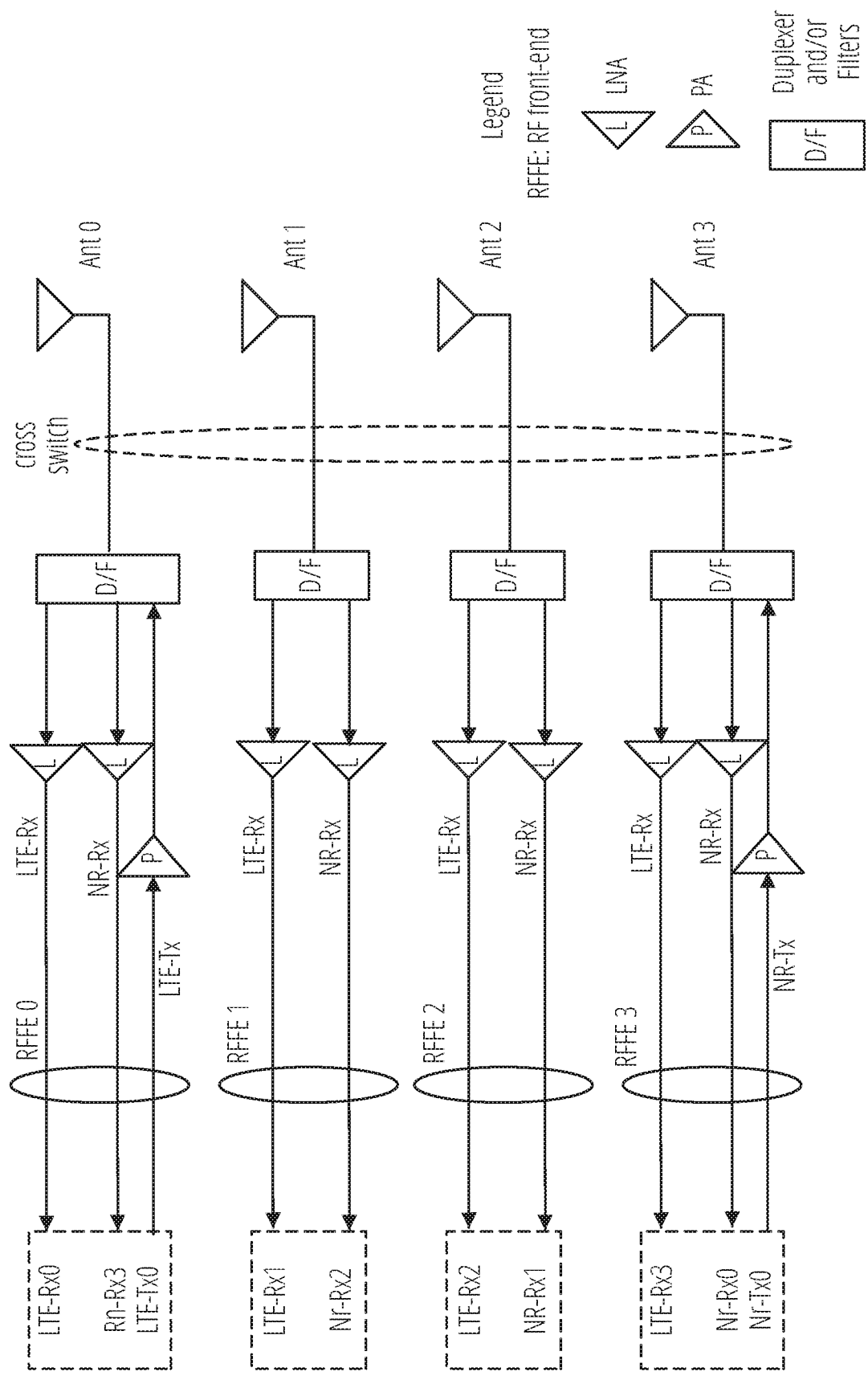
FIG. 11 illustrates an example embodiment of LTE and NR RATs/carriers equipped with shared RF front-end (RFFEs).

FIG. 11 illustrates an example of LTE+NR that are both 1Tx/4Rx and share a total of 4 RF front-ends and antennas. When LTE and NR jointly share the RF front-ends (and antennas), then SRS switching in one RAT may interrupt the other RAT.

Figure 12:
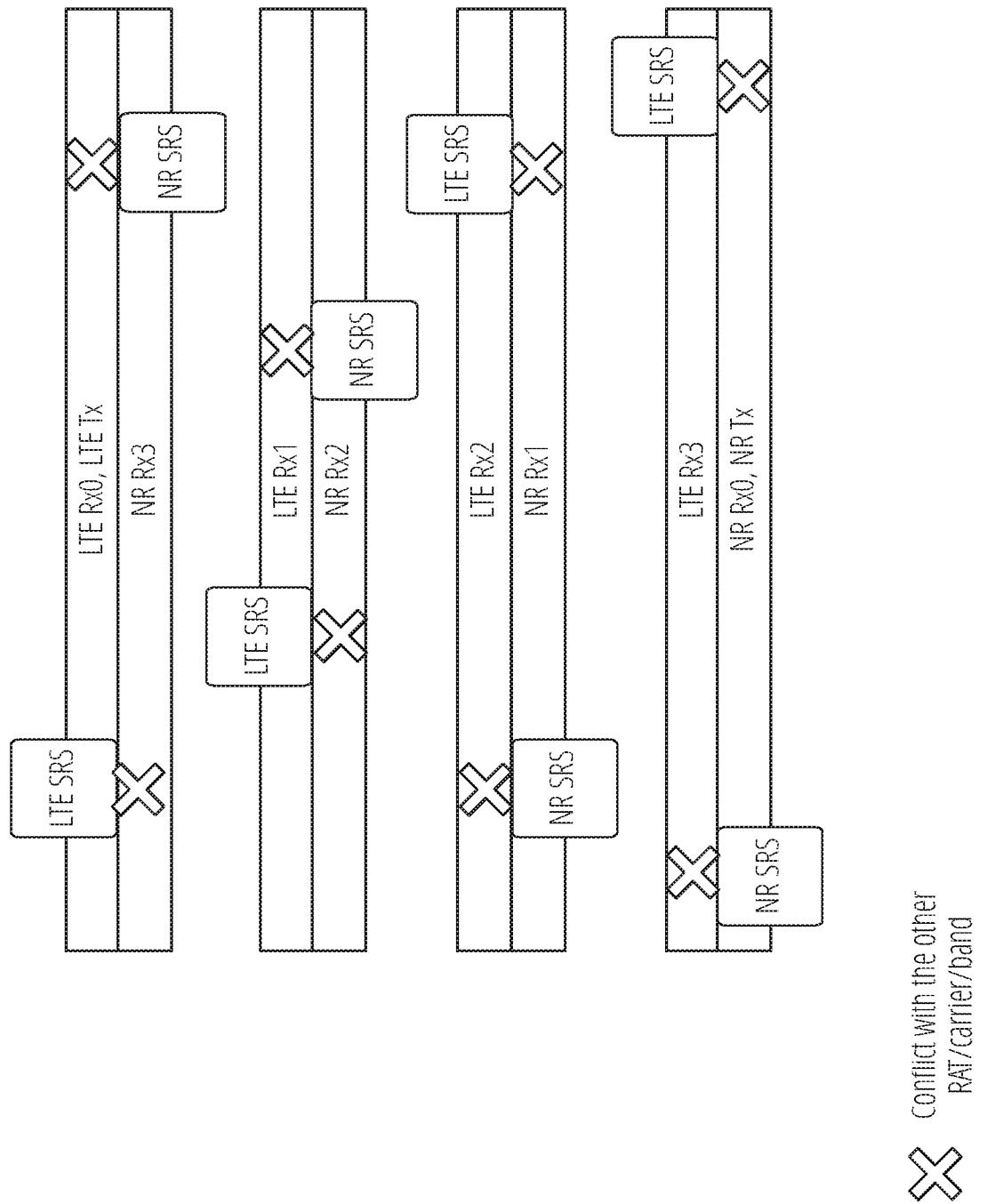
FIG. 12 illustrates an example embodiment of LTE and NR RATs/carriers equipped with shared RF front-end (RFFEs).

FIG. 12 illustrates another example (similar to FIG. 11) of fully shared RFFEs/antennas for LTE and NR, which may include conflict and blanking impact.

Figure 13:
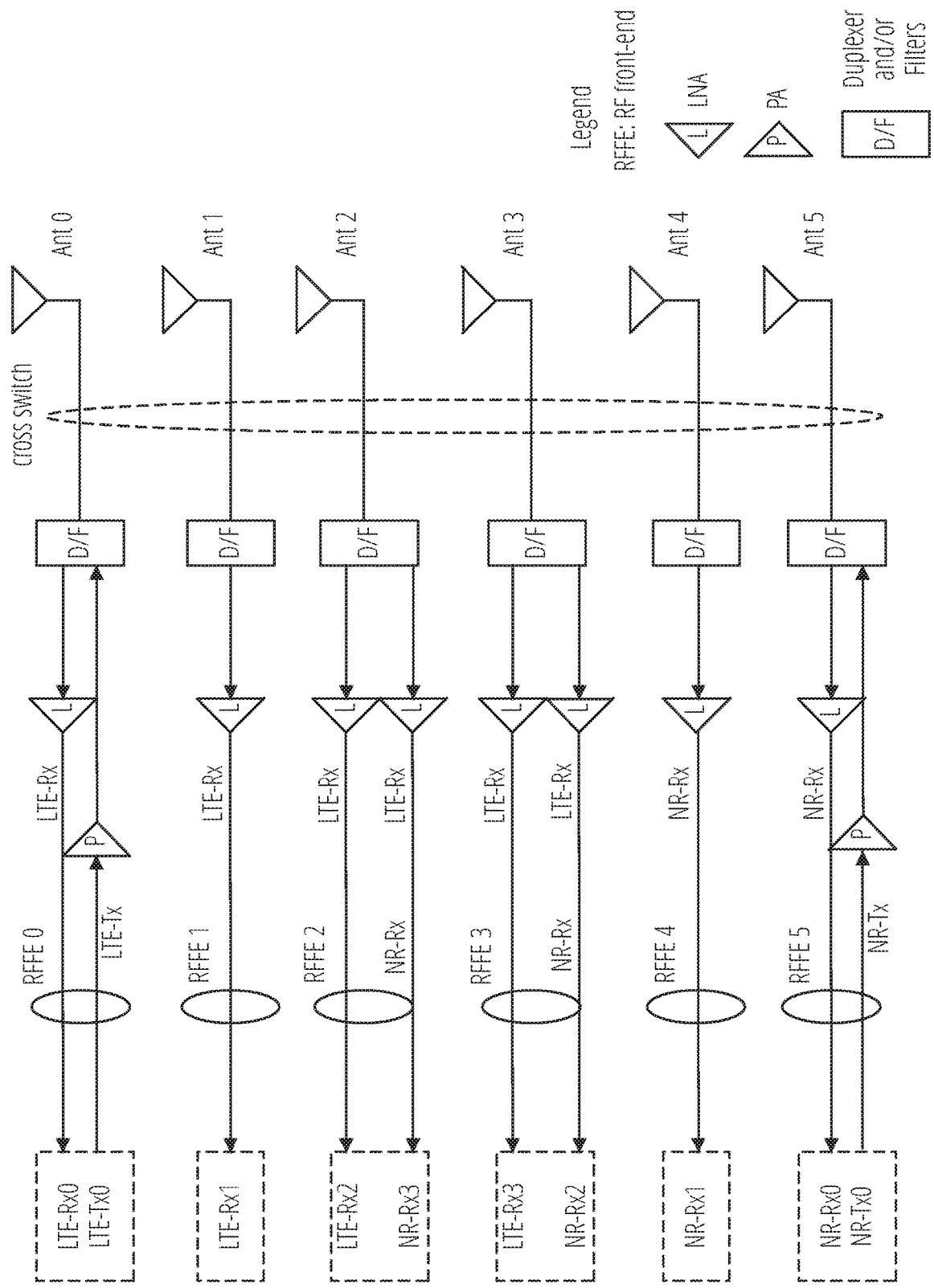
FIG. 13 illustrates an example embodiment of LTE and NR RATs/carriers equipped with shared RF front-end (RFFEs).

FIG. 13 illustrates an example of LTE+NR which are both 1Tx/4Rx that use a total of 6 RFFEs/antennas, where RFFE2 and RFFE3 are shared by the two RATs. Accordingly, in FIG. 13, LTE and NR may partially share some RFFEs/antennas. In such cases, SRS-switching of one RAT may interrupt the other RAT only when it conflicts with the shared RFFE.

Figure 14:
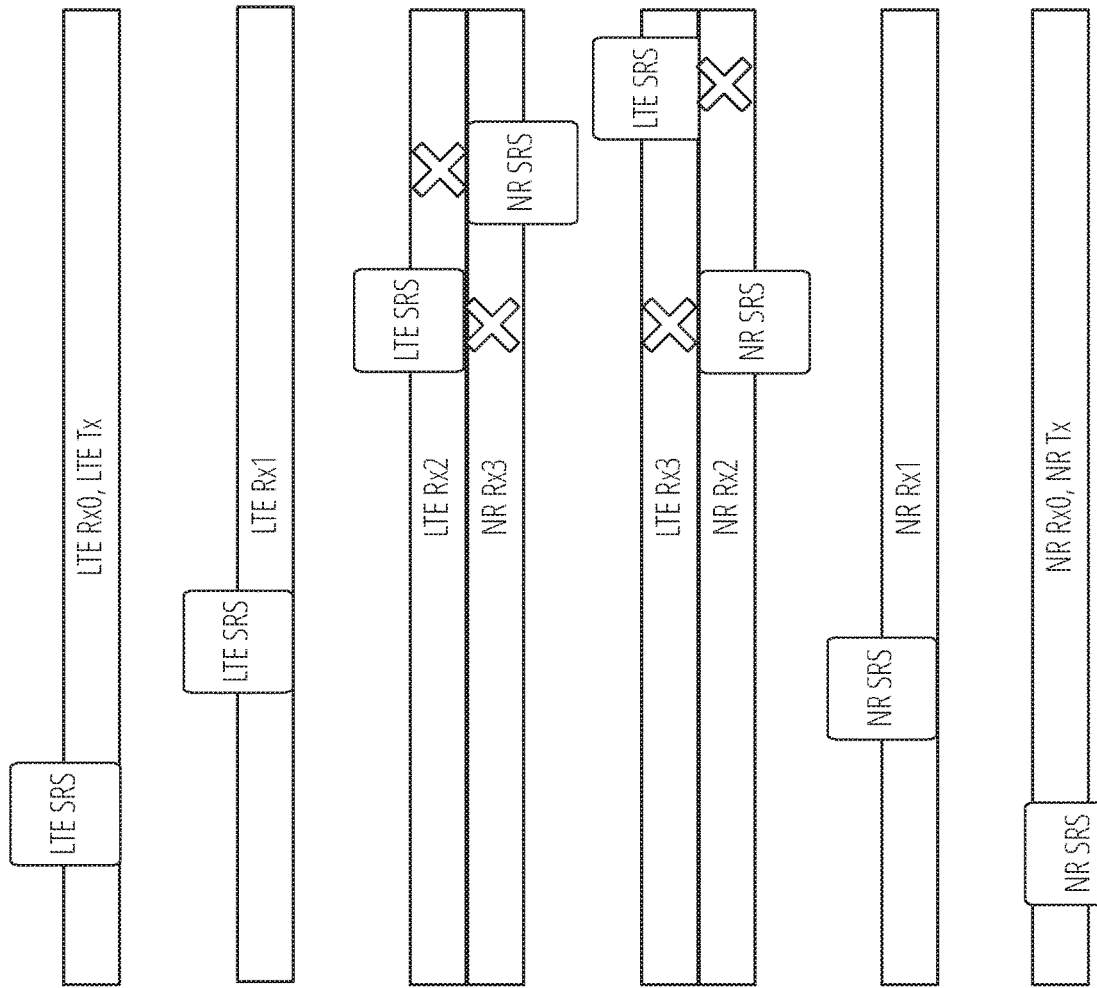
FIG. 14 illustrates an example embodiment of LTE and NR RATs/carriers equipped with shared RF front-end (RFFEs).

FIG. 14 illustrates another example (similar to FIG. 13) of partially shared RFFEs/antennas for LTE and NR, which results in conflict and blanking impact.

As a summary of the examples in FIGS. 9-14, the following applies: 1. FIG. 9 and FIG. 10 includes Completely independent RFFE resources and no conflict; 2. FIG. 11 and FIG. 12 include fully shared RFFE resources and conflicts; and 3. FIG. 13 and FIG. 14 include partially shared RFFE resources and conflict when colliding with shared RFFE resources.

Figure 15:
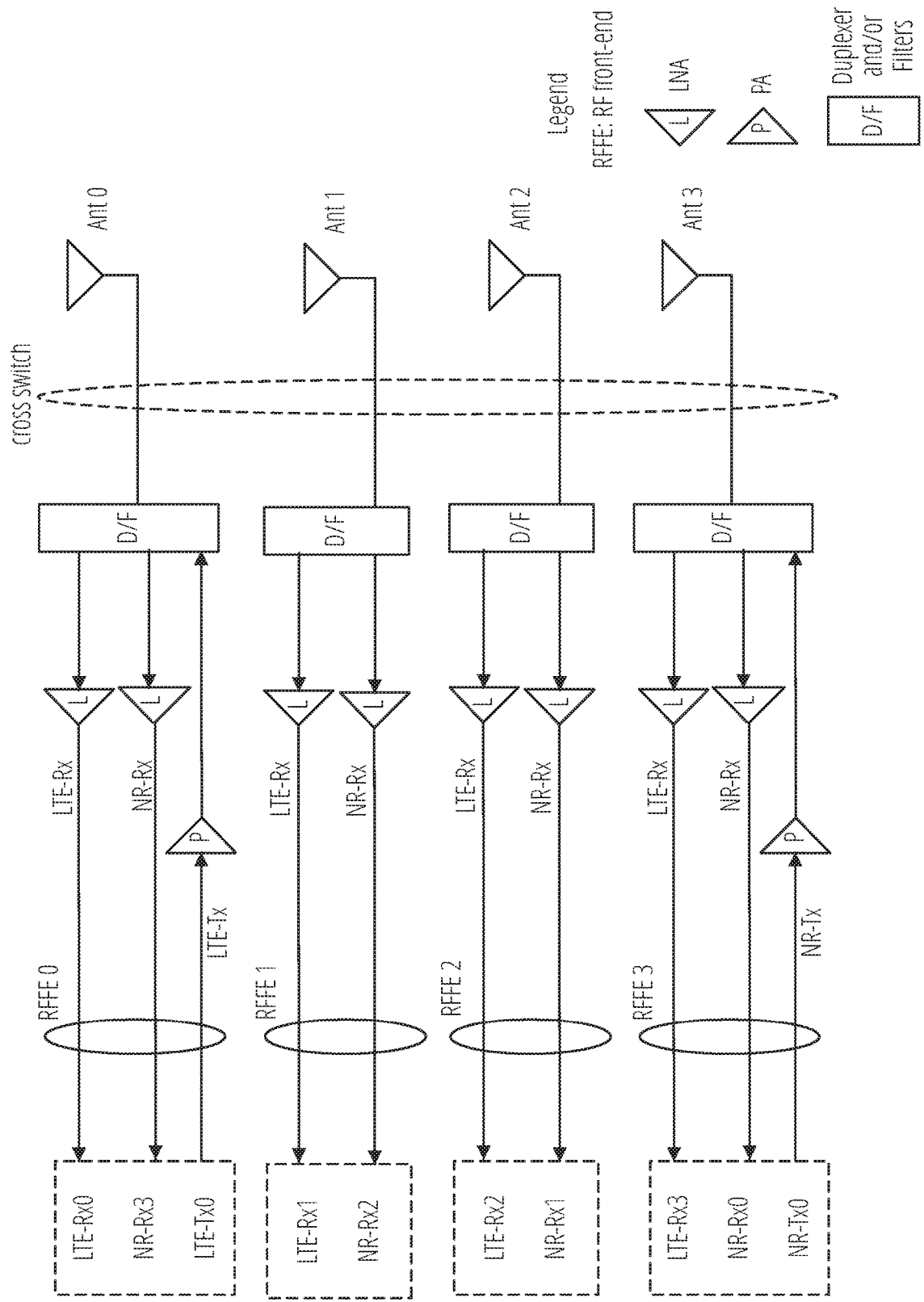
FIG. 15 illustrates a timeline view of an example embodiment of LTE and NR RATs/carriers equipped with shared RF front-end (RFFEs).
Figure 16:
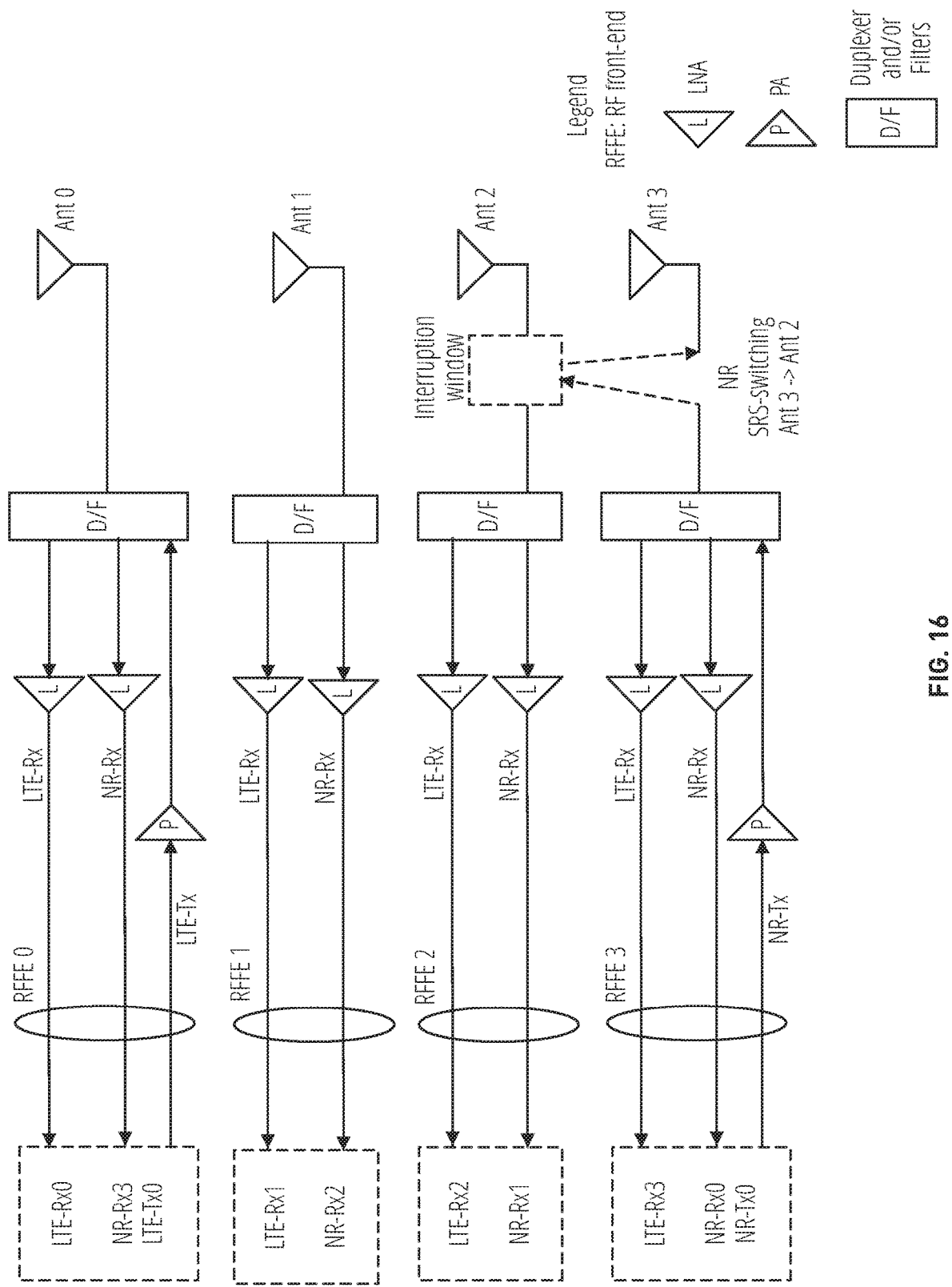
FIG. 16 illustrates a timeline view of an example embodiment of LTE and NR RATs/carriers equipped with shared RF front-end (RFFEs).
Figure 17:
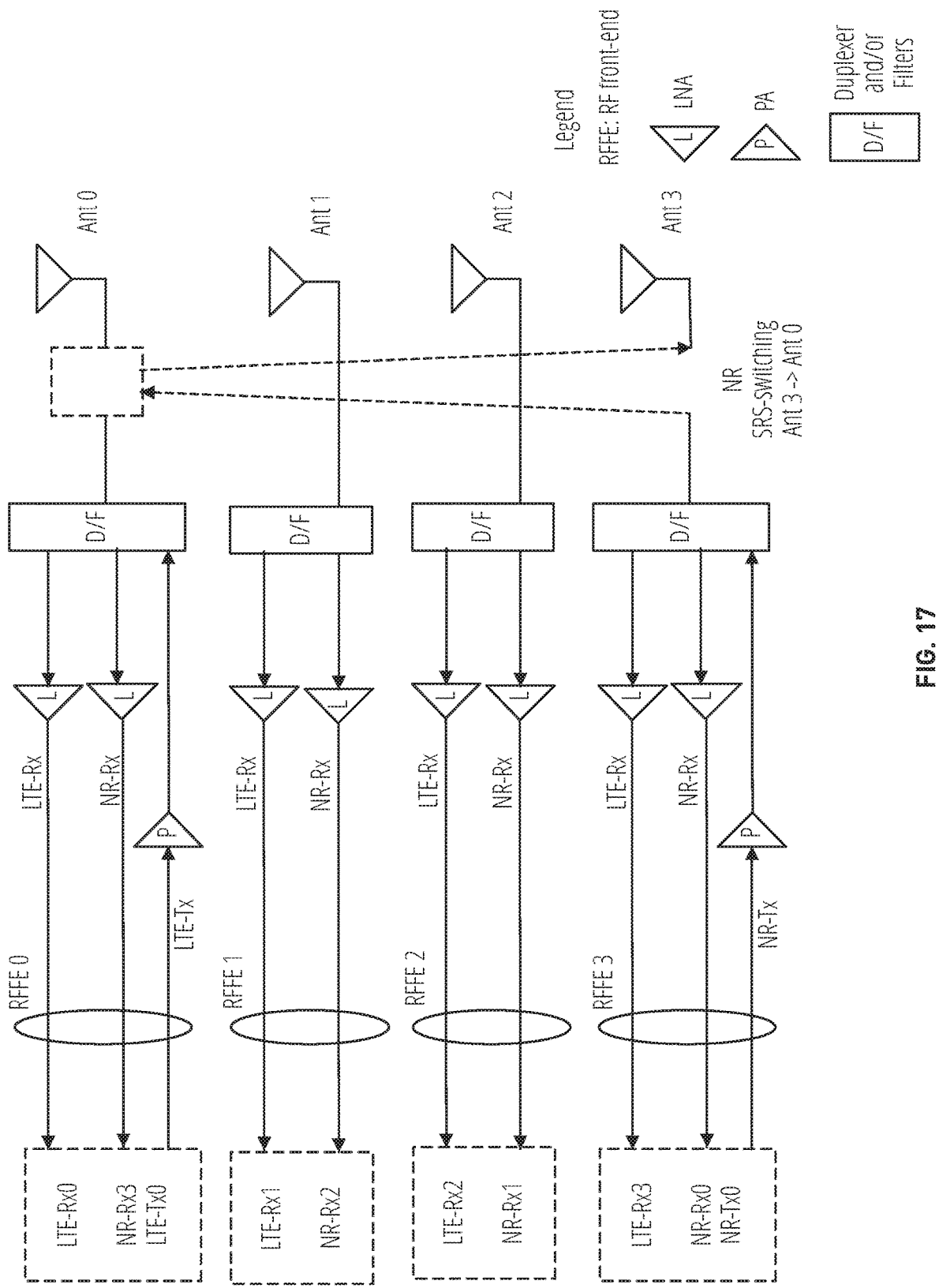
FIG. 17 illustrates a timeline view of an example embodiment of LTE and NR RATs/carriers equipped with shared RF front-end (RFFEs).

FIG. 15 illustrates a first portion of a timeline view associated with the example in FIG. 11 and FIG. 12 (FIG. 16 and FIG. 17 illustrate a second and third portion of the same timeline view of FIG. 15). As briefly described with respect to FIG. 11 and FIG. 12, FIG. 15 includes LTE and NR that jointly share 4 RFFEs/antennas. Notably, this timeline view analysis may apply to the example in FIG. 13 and FIG. 14, as well.

FIG. 16 illustrates a second portion of a timeline view associated with the example in FIG. 11 and FIG. 12. As shown in FIG. 16, when NR SRS switches from Ant-3 to Ant-2, it will interrupt LTE-Rx2, and LTE Rx-blanking is triggered within an interruption window.

FIG. 17 illustrates a third portion of a timeline view associated with the example in FIG. 11 and FIG. 12. As shown in FIG. 17, when NR SRS switches from Ant-3 to Ant-0, it will interrupt LTE-Tx0/Rx0, and LTE Tx/Rx-blanking is triggered within an interruption window.

The application of Tx-blanking and Rx-blanking also depends on RATs' FDD/TDD configurations. In particular when LTE/NR are synced-TDD, SRS-switching may cause Tx-blanking on the other RAT and No Rx-blanking since they are synced-TDD. In contrast, when LTE/NR are a-sync (or LTE/NR are FDD+TDD combo), SRS-switching may cause both Tx-blanking and Rx-blanking on the other RAT.

Figure 18:
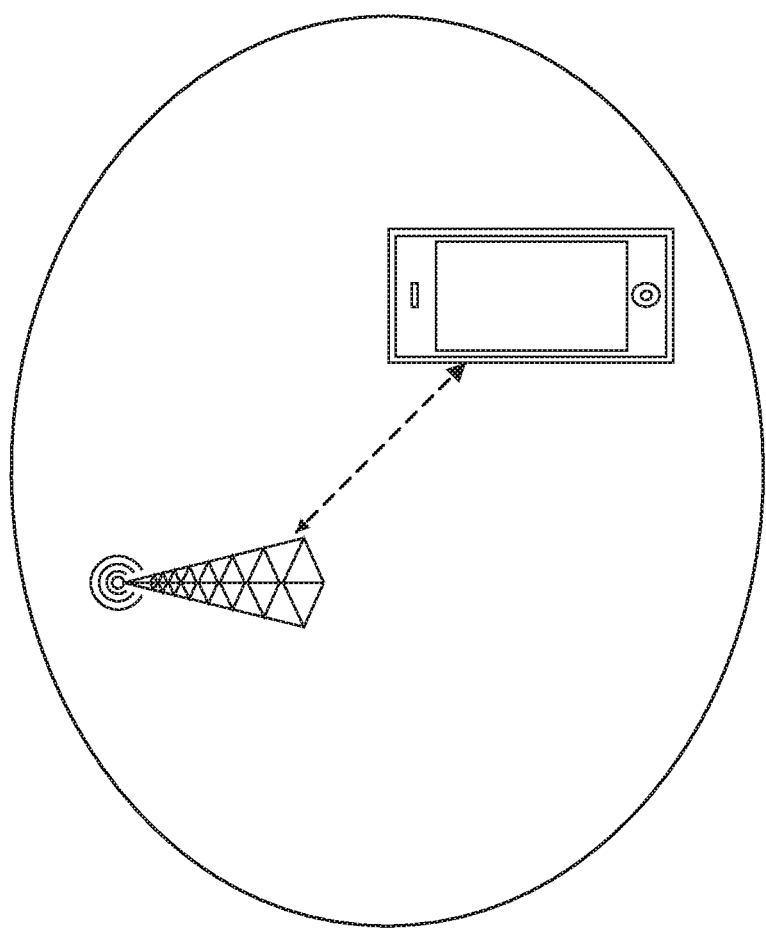
FIG. 18 illustrates an NS3 setup and assumption.

FIG. 18 illustrates the NS3 setup and assumption, as follows:

| Config | Description |
| --- | --- |
| Network | One BS <—> One UE |
| Blanking Config | Blanking on PDCCH, PDSCH, PUSCH (UL data part) |
| | NO blanking on UCI info (NS3 limitation) |
| | Blanking is implemented via faked SNR |
| Blanking Periodicity | 1 ms blanking in every X ms (e.g., X = 20) |
| | Blanking is aligned with subframe boundary |
| FDD/TDD | FDD only (insight can help judge TDD case) |
| Traffic | Full buffer with UDP or TCP (3GPP-compliant) |
| LTE Model | NS3 LENA LTE model |
| | CAT4 LTE with 2Rx |
| | Max 2 layers (2x2 MIMO) |
| | Max L1 rate 150 Mbps |
| SNR Setup | Adjust BS-UE distance to simulate different SNRs |

Figure 19:
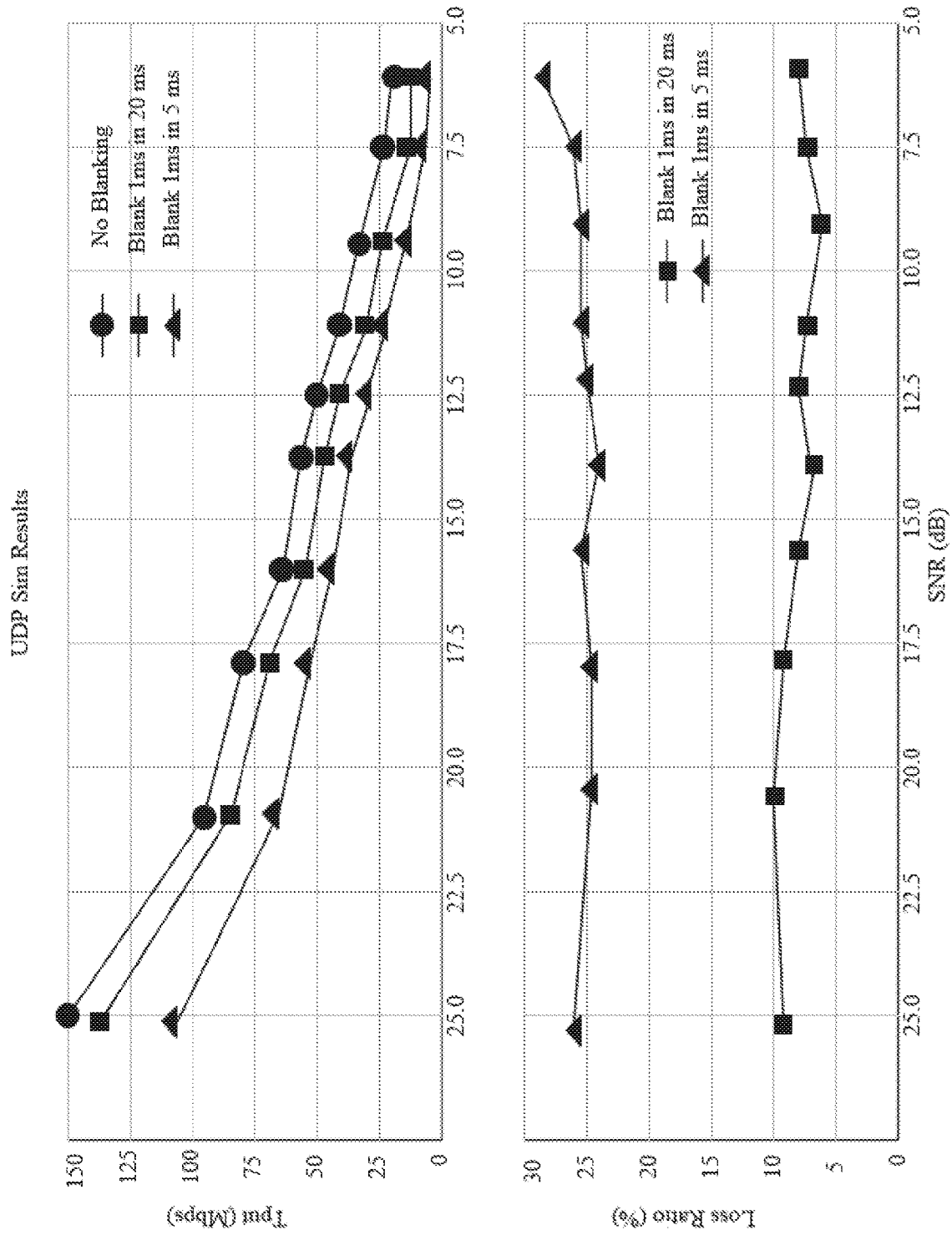
FIG. 19 illustrates an example of UDP throughput and loss under different SNR values.
Figure 20:
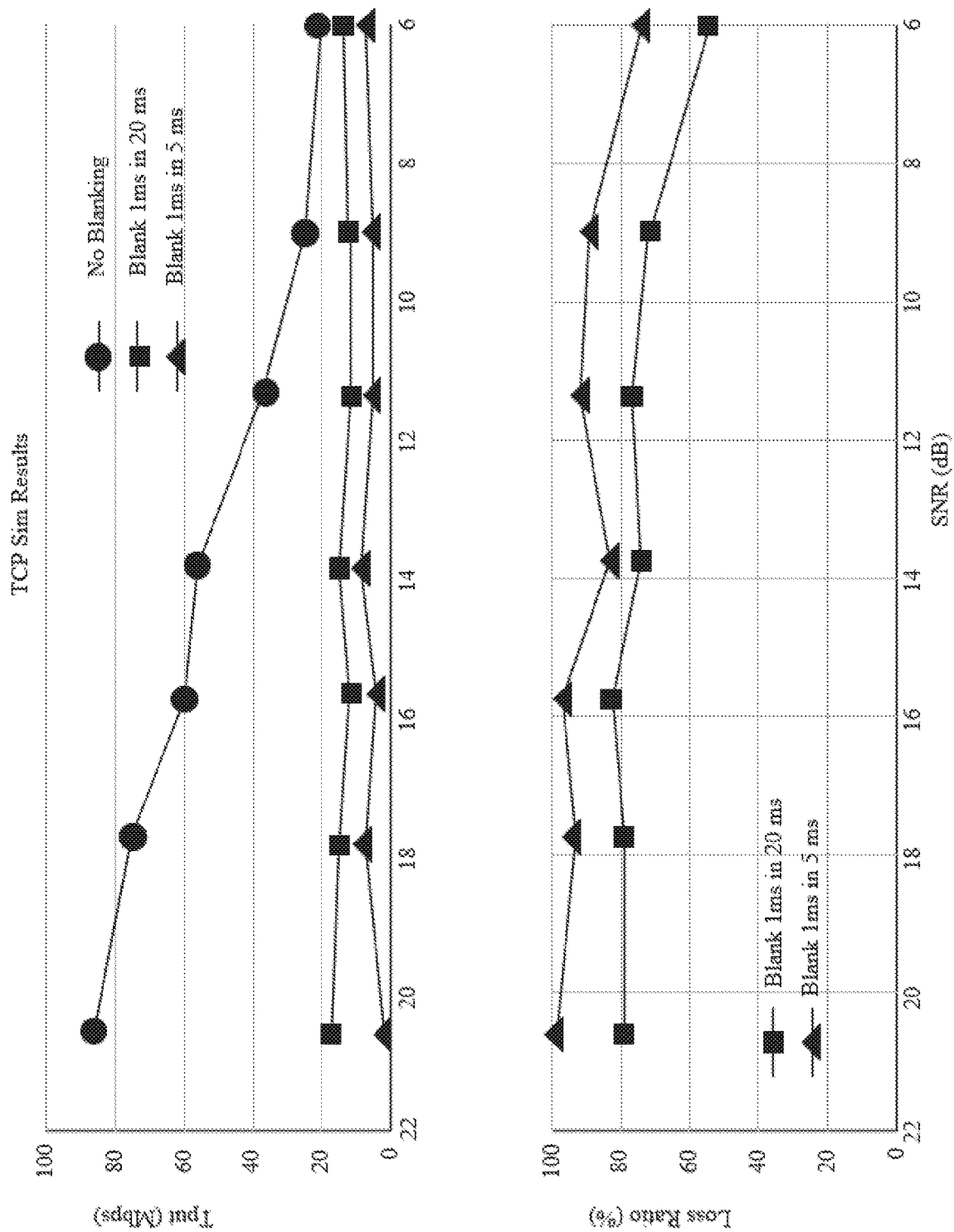
FIG. 20 illustrates an example of TCP throughput and loss under different SNR values.

FIG. 19 illustrates an example of UDP throughput and loss under different SNR values. FIG. 20 illustrates an example of TCP throughput and loss under different SNR values. As shown, regarding blanking periodicity, more frequent blanking (20 ms to 5 ms) causes higher loss ratio. Regarding TCP vs UDP, compared to the UDP case, the TCP result shows much worse loss ratio. Regarding TDD Config, simulation is with FDD configuration and TDD configuration has less DL and UL subframes; its loss ratio may be higher. Regarding concurrent Tx/Rx blanking, simulation assumes both Tx-blanking and Rx-blanking, which is the worst case. VOIP Scenario prefers heavily-loaded network with a large number of UEs.

Blanking design should gracefully handle the blanked subframe. A good design may target on a soft-blanking solution with the below considerations:

| Item | Consideration |
| --- | --- |
| Partial Subframe | For subframe that is only partially blanked, try to utilize the info that is not affected (PDCCH, CRS in slot 0, etc) |
| Corrupted Info | Corrupted info derived from blanked subframe may be excluded in loop operation, including CSI loop, time/freqloop, etc |
| Cross-SF Blanking | Optimize blanking timeline to avoid cross-SF blanking as much as possible (cross-SF affects two consecutive SFs) |
| Signaling Priority | Handle priority rule in case LTE UCI/BSR/PHR/meas collides with SRS blanking |
| RRC Out-of-Sync | Design fall-back mechanism in place if NW/UE becomes out-of-sync due to missing RRC msg during blanking |
| Interaction with Adaptive Tx/Rx Antenna Selection | Adaptive Tx/Rx antenna selection should consider SRS blanking impact for joint optimization |

3GPP Release 15, Section 38.822, Table 4.1-1 also includes SRS Tx-switching capabilities.

Figure 21:
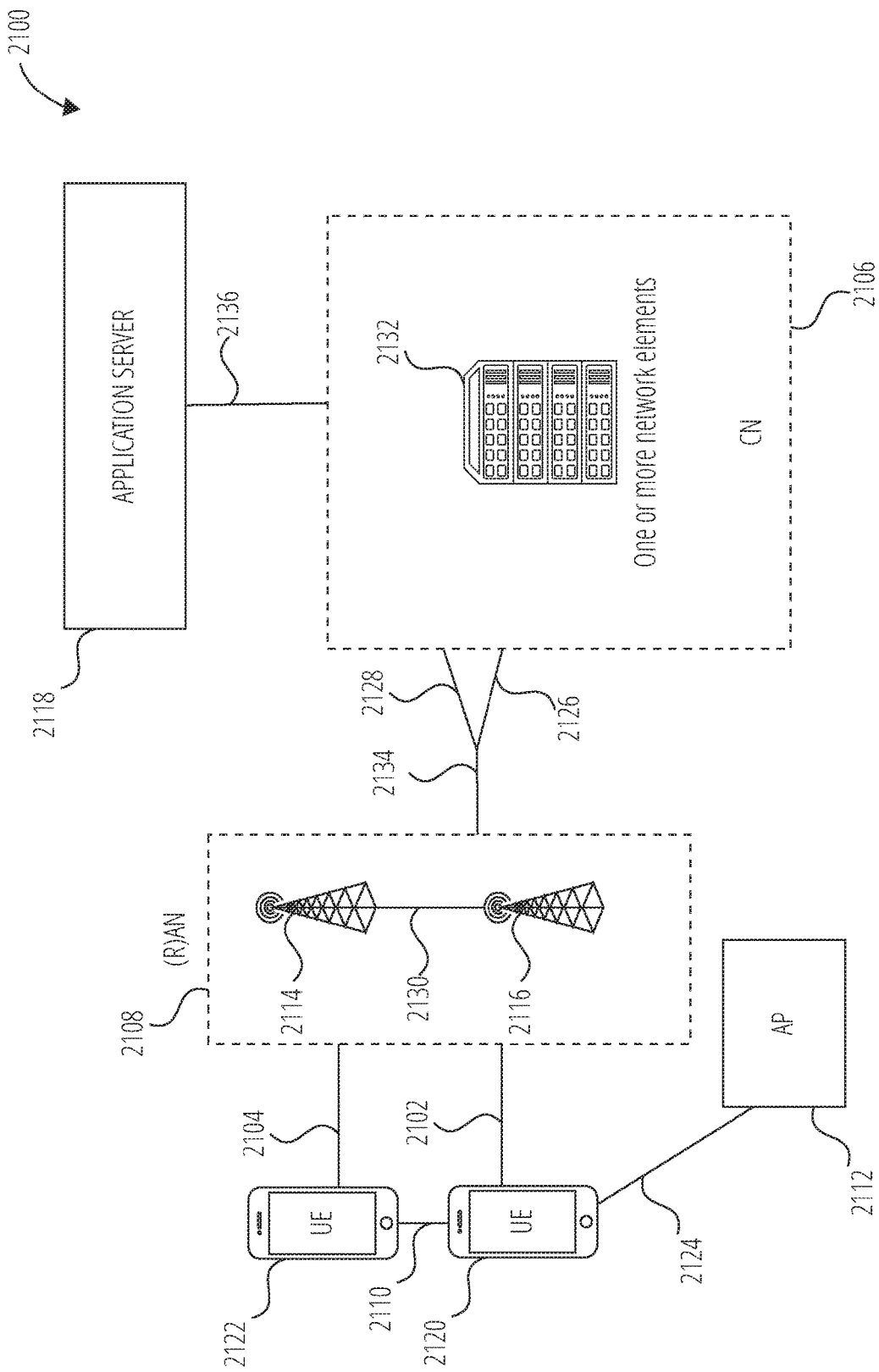
FIG. 21 illustrates a system in accordance with one embodiment.

FIG. 21 illustrates an example architecture of a system 2100 of a network, in accordance with various embodiments. The following description is provided for an example system 2100 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 21, the system 2100 includes LTE 2122 and LTE 2120. In this example, the UE 2122 and the UE 2120 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 2122 and/or the UE 2120 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure with short-lived connections. The IoT UEs may execute background applications (e.g., keep-alive messages, status updates, etc.) to facilitate the connections of the IoT network.

The UE 2122 and UE 2120 may be configured to connect, for example, communicatively couple, with an access node or radio access node (shown as (R)AN 2108). In embodiments, the (R)AN 2108 may be an NG RAN or a 5G RAN, an E-UTRAN, or a legacy RAN, such as a UTRAN or GERAN. As used herein, the term "NG RAN" or the like may refer to a (R)AN 2108 that operates in an NR or 5G system, and the term "E-UTRAN" or the like may refer to a (R)AN 2108 that operates in an LTE or 4G system. The UE 2122 and UE 2120 utilize connections (or channels) (shown as connection 2104 and connection 2102, respectively), each of which comprises a physical communications interface or layer (discussed in further detail below).

In this example, the connection 2104 and connection 2102 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UE 2122 and UE 2120 may directly exchange communication data via a ProSe interface 2110. The ProSe interface 2110 may alternatively be referred to as a sidelink (SL) interface 110 and may comprise one or more logical channels, including but not limited to a PSCCH, a PSSCH, a PSDCH, and a PSBCH.

The UE 2120 is shown to be configured to access an AP 2112 (also referred to as "WLAN node," "WLAN," "WLAN Termination," "WT" or the like) via connection 2124. The connection 2124 can comprise a local wireless connection, such as a connection consistent with any IEEE 802.11 protocol, wherein the AP 2112 would comprise a wireless fidelity (Wi-Fi®) router. In this example, the AP 2112 may be connected to the Internet without connecting to the core network of the wireless system (described in further detail below). In various embodiments, the UE 2120, (R)AN 2108, and AP 2112 may be configured to utilize LWA operation and/or LWIP operation. The LWA operation may involve the UE 2120 in RRC_CONNECTED being configured by the RAN node 2114 or the RAN node 2116 to utilize radio resources of LTE and WLAN. LWIP operation may involve the UE 2120 using WLAN radio resources (e.g., connection 2124) via IPsec protocol tunneling to authenticate and encrypt packets (e.g., IP packets) sent over the connection 2124. IPsec tunneling may include encapsulating the entirety of original IP packets and adding a new packet header, thereby protecting the original header of the IP packets.

The (R)AN 2108 can include one or more AN nodes, such as RAN node 2114 and RAN node 2116, that enable the connection 2104 and connection 2102. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or 5G system (for example, a gNB), and the term "E-UTRAN node" or the like may refer to a RAN node that operates in an LTE or 4G system 2100 (e.g., an eNB). According to various embodiments, the RAN node 2114 or RAN node 2116 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 2114 or RAN node 2116 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 2114 or RAN node 2116); a MAC/PHY split wherein RRC, PDCP, RLC, and MAC layers are operated by the CRAN/vBBUP and the PHY layer is operated by individual RAN nodes (e.g., RAN node 2114 or RAN node 2116); or a "lower PHY" split wherein RRC, PDCP, RLC, MAC layers and upper portions of the PRY layer are operated by the CRAN/vBBUP and lower portions of the PHY layer are operated by individual RAN nodes. This virtualized framework allows the freed-up processor cores of the RAN node 2114 or RAN node 2116 to perform other virtualized applications. In some implementations, an individual RAN node may represent individual gNB-DUs that are connected to a gNB-CU via individual F1 interfaces (not shown by FIG. 21). In these implementations, the gNB-DUs may include one or more remote radio heads or RFEMs, and the gNB-CU may be operated by a server that is located in the (R)AN 2108 (not shown) or by a server pool in a similar manner as the CRAN/vBRUP. Additionally, or alternatively, one or more of the RAN node 2114 or RAN node 2116 may be next generation eNBs (ng-eNBs), which are RAN nodes that provide E-UTRA user plane and control plane protocol terminations toward the UE 2122 and UE 2120, and are connected to an SGC via an NG interface (discussed infra). In V2X scenarios one or more of the RAN node 2114 or RAN node 2116 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/ software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may opera as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 2114 and/or the RAN node 2116 can terminate the air interface protocol and can be the first point of contact for the UE 2122 and UE 2120. In some embodiments, the RAN node 2114 and/or the RAN node 2116 can fulfill various logical functions for the (R)AN 2108 including, but not limited to, radio network controller (RNC) functions such as radio bearer management, uplink and downlink dynamic radio resource management and data packet scheduling, and mobility management.

In embodiments, the UE 2122 and UE 2120 can be configured to communicate using OFDM communication signals with each other or with the RAN node 2114 and/or the RAN node 2116 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 2114 and/or the RAN node 2116 to the UE 2122 and UE 2120, while uplink transmissions can utilize similar techniques. The grid can be a time-frequency grid, called a resource grid or time-frequency resource grid, which is the physical resource in the downlink in each slot, Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 2122 and UE 2120 and the RAN node 2114 and/or the RAN node 2116 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 2122 and UE 2120 and the RAN node 2114 or RAN node 2116 may operate using LAA, eLAA, and/or feLAA mechanisms. In these implementations, the UE 2122 and UE 2120 and the RAN node 2114 or RAN node 2116 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 2122 and UE 2120, RAN node 2114 or RAN node 2116, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 2122, AP 2112, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 2122 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 2122 and UE 2120. The PDCCH carries information about the transport format and resource allocations related to the PDSCH channel, among other things. It may also inform the UE 2122 and UE 2120 about the transport format, resource allocation, and HARQ information related to the uplink shared channel. Typically, downlink scheduling (assigning control and shared channel resource blocks to the UE 2120 within a cell) may be performed at any of the RAN node 2114 or RAN node 2116 based on channel quality information fed back from any of the UE 2122 and UE 2120. The downlink resource assignment information may be sent on the PDCCH used for (e.g., assigned to) each of the UE 2122 and UE 2120.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDCCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 2114 or RAN node 2116 may be configured to communicate with one another via interface 2130. In embodiments where the system 2100 is an LTE system (e.g., when CN 2106 is an EPC), the interface 2130 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 2122 from an SeNB for user data; information of PDCP PDUs that were not delivered to a UE 2122; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 2100 is a 5G or NR system (e.g., when CN 2106 is an 5GC), the interface 2130 may be an Xn interface. The Xn interface is defined between two or more RAN nodes (e.g., two or more gNBs and the like) that connect to 5GC, between a RAN node 2114 (e.g., a gNB) connecting to 5GC and an eNB, and/or between two eNBs connecting to 5GC (e.g., CN 2106). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 2122 in a connected mode (e.g., CM-CONNECTED) including functionality to manage the UE mobility for connected mode between one or more RAN node 2114 or RAN node 2116. The mobility support may include context transfer from an old (source) serving RAN node 2114 to new (target) serving RAN node 2116; and control of user plane tunnels between old (source) serving RAN node 2114 to new (target) serving RAN node 2116. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 2108 is shown to be communicatively coupled to a core network—in this embodiment, CN 2106.

The CN 2106 may comprise one or more network elements 2132, which are configured to offer various data and telecommunications services to customers/subscribers (e.g., users of UE 2122 and UE 2120) who are connected to the CN 2106 via the (R)AN 2108. The components of the CN 2106 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 2106 may be referred to as a network slice, and a logical instantiation of a portion of the CN 2106 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 2118 may be an element offering applications that use IP bearer resources with the core network (e.g., UNITS PS domain, LTE PS data services, etc.). The application server 2118 can also be configured to support one or more communication services (e.g., VoIP sessions, PTT sessions, group communication sessions, social networking services, etc.) for the UE 2122 and UE 2120 via the EPC. The application server 2118 may communicate with the CN 2106 through an IP communications interface 2136.

In embodiments, the CN 2106 may be an SGC, and the (R)AN 116 may be connected with the CN 2106 via an NG interface 2134. In embodiments, the NG interface 2134 may be split into two parts, an NO user plane (NG-U) interface 2126, which carries traffic data between the RAN node 2114 or RAN node 2116 and a LIPF, and the S1 control plane (NG-C) interface 2128, which is a signaling interface between the RAN node 2114 or RAN node 2116 and AMFs.

In embodiments, the CN 2106 may be a SG CN, while in other embodiments, the CN 2106 may be an EPC). Where CN 2106 is an EPC, the (R)AN 116 may be connected with the CN 2106 via an S1 interface 2134. In embodiments, the S1 interface 2134 may be split into two parts, an S1 user plane (S1-U) interface 2126, which carries traffic data between the RAN node 2114 or RAN node 2116 and the S-GW, and the S1-MME interface 2128, which is a signaling interface between the RAN node 2114 or RAN node 2116 and MMEs.

Figure 22:
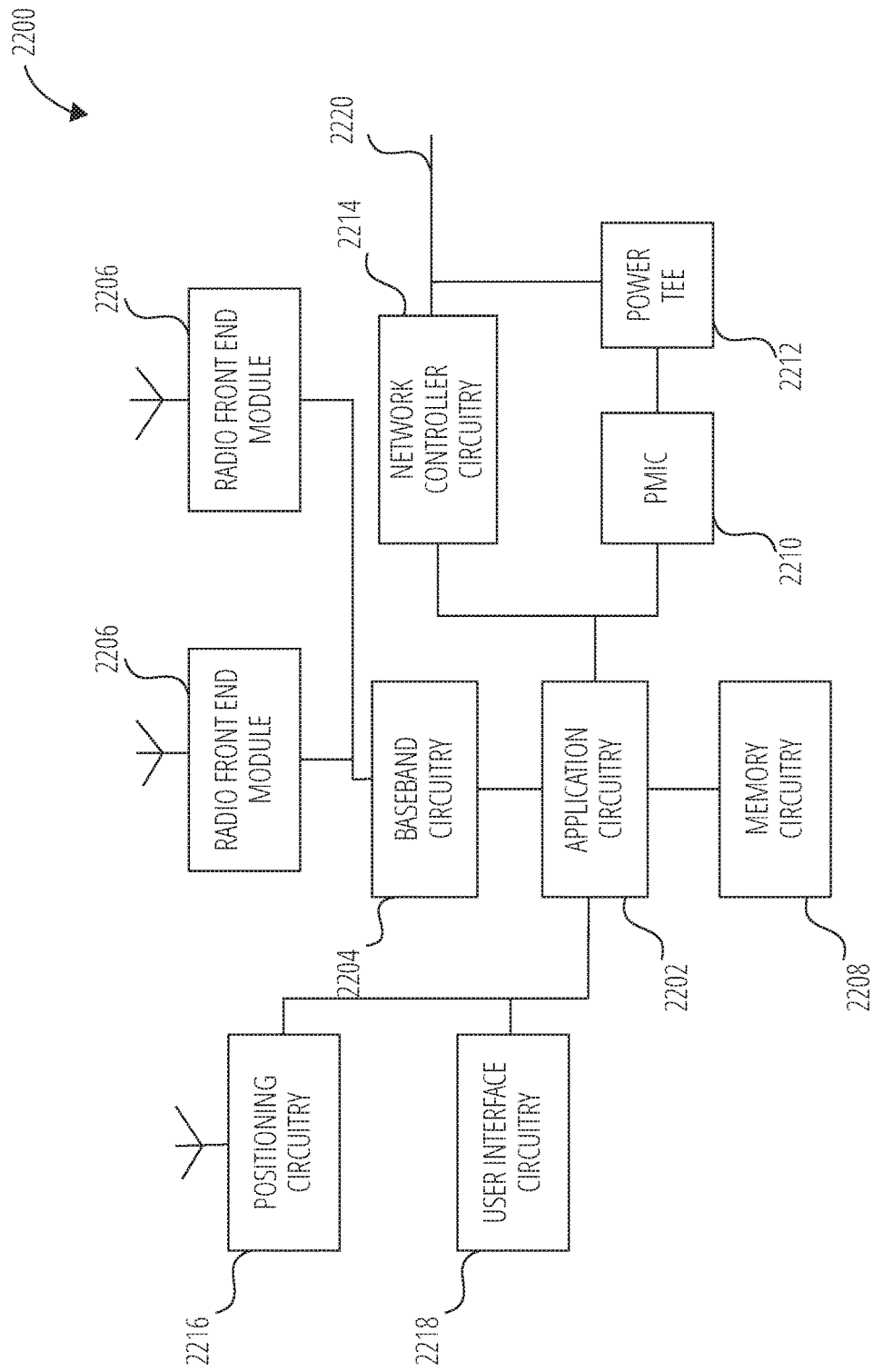
FIG. 22 illustrates an infrastructure equipment in accordance with one embodiment.

FIG. 22 illustrates an example of infrastructure equipment 2200 in accordance with various embodiments. The infrastructure equipment 2200 may be implemented as a base station, radio head, RAN node, AN, application server, and/or any other element/device discussed herein. In other examples, the infrastructure equipment 2200 could be implemented in or by a UE.

The infrastructure equipment 2200 includes application circuitry 2202, baseband circuitry 2204, one or more radio front end module 2206 (RFEM), memory circuitry 2208, power management integrated circuitry (shown as PMIC 2210), power tee circuitry 2212, network controller circuitry 2214, network interface connector 2220, satellite positioning circuitry 2216, and user interface circuitry 2218. In some embodiments, the device infrastructure equipment 2200 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 2202 includes circuitry such as, but not limited to one or more processors (or processor cores), cache memory, and one or more of low drop-out voltage regulators (LDOs), interrupt controllers, serial interfaces such as SPI, $I^2C$ or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor interface (MIPI) interfaces and Joint Test Access Group (JTAG) test access ports. The processors (or cores) of the application circuitry 2202 may be coupled with or may include memory/storage elements and may be configured to execute instructions stored in the memory/storage to enable various applications or operating systems to run on the infrastructure equipment 2200. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 2202 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more. ASICs, one or more microprocessors or controllers, or any suitable combination thereof. In some embodiments, the application circuitry 2202 may comprise, or may be, a special-purpose processor/controller to operate according to the various embodiments herein. As examples, the processor(s) of application circuitry 2202 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd, such as the ARM Cortex-A family of processors and the ThunderX2® provided by Caviutn™, Inc.; a MIPS-based design from MIPS Technologies, Inc. such as MIPS Warrior P-class processors; and/or the like. In some embodiments, the infrastructure equipment 2200 may not utilize application circuitry 2202, and instead may include a special-purpose processor/controller to process IP data received from an EPC or 5GC, for example.

In some implementations, the application circuitry 2202 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 2202 may comprise logic blocks or logic fabric, and other interconnected resources that may be programmed to perform various functions, such as the procedures, methods, functions, etc. of the various embodiments discussed herein. In such embodiments, the circuitry of application circuitry 2202 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like. The baseband circuitry 2204 may be implemented, for example, as a solder-down substrate including one or more integrated circuits, a single packaged integrated circuit soldered to a main circuit board or a multi-chip module containing two or more integrated circuits.

The user interface circuitry 2218 may include one or more user interfaces designed to enable user interaction with the infrastructure equipment 2200 or peripheral component interfaces designed to enable peripheral component interaction with the infrastructure equipment 2200. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 2206 may comprise a millimeter wave mWave) radio front end module (RFEM) and one or more sub-mmWave radio frequency integrated circuits (RFICs). In some implementations, the one or more sub-mmWave RFICs may be physically separated from the trunWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 2206, which incorporates both mmWave antennas and sub-mmWave.

The memory circuitry 2208 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. The memory circuitry 2208 may be implemented as one or more of solder down packaged integrated circuits, socketed memory modules and plug-in memory cards.

The PMIC 2210 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 2212 may provide for electrical power drawn from a network cable to provide both power supply and data connectivity to the infrastructure equipment 2200 using a single cable.

The network controller circuitry 2214 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 2200 via network interface connector 2220 using a physical connection, which may be electrical (commonly referred to as a "copper interconnect"), optical, or wireless. The network controller circuitry 2214 may include one or more dedicated processors and/or FPGAs to communicate using one or more of the aforementioned protocols. In some implementations, the network controller circuitry 2214 may include multiple controllers to provide connectivity to other networks using the same or different protocols.

The positioning circuitry 2216 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo System, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 2216 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 2216 may include a Micro-Technology for Positioning, Navigation, and Timing (Micro-PNT) IC that uses a master timing clock to perform position tracking/estimation without GNSS assistance. The positioning circuitry 2216 may also be part of, or interact with, the baseband circuitry 2204 and/or radio front end module 2206 to communicate with the nodes and components of the positioning network. The positioning circuitry 2216 may also provide position data and/or time data to the application circuitry 2202, which may use the data to synchronize operations with various infrastructure, or the like. The components shown by FIG. 22 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCix), PCI express (PCie), or any number of other technologies. The bus/IX may be a proprietary bus, for example, used in a SoC based system. Other bus/IX systems may be included, such as an $I^2C$ interface, an SPI interface, point to point interfaces, and a power bus, among others.

Figure 23:
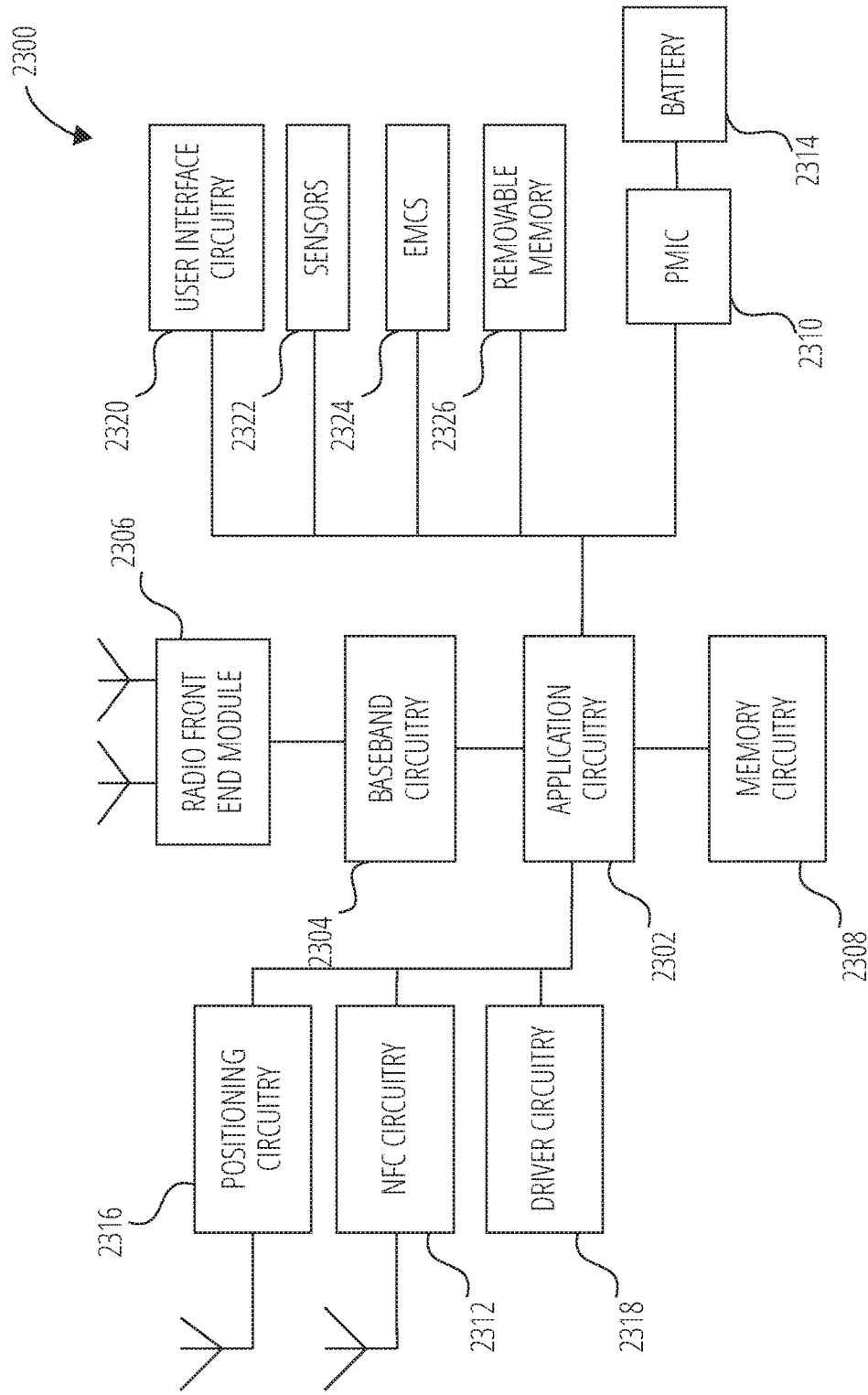
FIG. 23 illustrates a platform in accordance with one embodiment.

FIG. 23 illustrates an example of a platform 2300 in accordance with various embodiments. In embodiments, the computer platform 2300 may be suitable for use as UEs, application servers, and/or any other element/device discussed herein. The platform 2300 may include any combinations of the components shown in the example. The components of platform 2300 may be implemented as integrated circuits (ICs), portions thereof, discrete electronic devices, or other modules, logic, hardware, software, firmware, or a combination thereof adapted in the computer platform 2300, or as components otherwise incorporated within a chassis of a larger system. The block diagram of FIG. 23 is intended to show a high level view of components of the computer platform 2300. However, some of the components shown may be omitted, additional components may be present, and different arrangement of the components shown may occur in other implementations.

Application circuitry 2302 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose IO, memory card controllers such as SD MMC or similar, USB interfaces, MIPI interfaces, and JTAG test access ports. The processors (or cores) of the application circuitry 2302 may be coupled with or may include memory/storage elements and may be configured to execute instructions stored in the memory/storage to enable various applications or operating systems to run on the platform 2300. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 2302 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 2302 may comprise, or may be, a special-purpose processor/controller to operate according to the various embodiments herein.

As examples, the processor(s) of application circuitry 2302 may include an Intel® Architecture Core™ based processor, such as a Quark™, an Atorn™, an i3, an i5, an i7, or an MCU-class processor, or another such processor available from Intel® Corporation. The processors of the application circuitry 2302 may also be one or more of Advanced Micro Devices (AMD) Ryzen® processor(s) or Accelerated Processing Units (APUs); AS-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings. Ltd., such as the ARM Cortex-A, Cortex-R, and Cortex-M family of processors; or the like. In some implementations, the application circuitry 2302 may be a part of a system on a chip (SoC) in which the application circuitry 2302 and other components are formed into a single integrated circuit, or a single package, such as the Edison™ or Galileo™ SoC boards from Intel® Corporation.

Additionally or alternatively, application circuitry 2302 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 2302 may comprise logic blocks or logic fabric, and other interconnected resources that may be programmed to perform various functions, such as the procedures, methods, functions, etc. of the various embodiments discussed herein. In such embodiments, the circuitry of application circuitry 2302 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 2304 may be implemented, for example, as a solder-down substrate including one or more integrated circuits, a single packaged integrated circuit soldered to a main circuit board or a multi-chip module containing two or more integrated circuits.

The radio front end module 2306 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 2306, which incorporates both mmWave antennas and sub-mmWave.

The memory circuitry 2308 may include any number and type of memory devices used to provide for a given amount of system memory. As examples, the memory circuitry 2308 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 2308 may be developed in accordance with a Joint Electron Devices Engineering Council (JEDEC) low power double data rate (LPDDR)-based design, such as LPDDR2, LPDDR3, LPDDR4, or the like. Memory circuitry 2308 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 2308 maybe on-die memory or registers associated with the application circuitry 2302. To provide for persistent storage of information such as data, applications, operating systems and so forth, memory circuitry 2308 may include one or more mass storage devices, which may include, inter alia, a solid state disk drive (SSDD), hard disk drive (HDD), a microHDD, resistance change memories, phase change memories, holographic memories, or chemical memories, among others. For example, the computer platform 2300 may incorporate the three-dimensional (3D) cross-point (XPOINT) memories from Intel® and Micron®.

The removable memory 2326 may include devices, circuitry, enclosures/housings, ports or receptacles, etc. used to couple portable data storage devices with the platform 2300. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 2300 may also include interface circuitry (not shown) that is used to connect external devices with the platform 2300. The external devices connected to the platform 2300 via the interface circuitry include sensors 2322 and electro-mechanical components (shown as EMCs 2324), as well as removable memory devices coupled to removable memory 2326.

The sensors 2322 include devices, modules, or subsystems whose purpose is to detect events or changes in its environment and send the information (sensor data) about the detected events to some other a device, module, subsystem, etc. Examples of such sensors include, inter alia, inertia, measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 2324 include devices, modules, or subsystems whose purpose is to enable platform 2300 to change its state, position, and/or orientation, or move or control a mechanism or (sub)system. Additionally, EMCs 2324 may be configured to generate and send messages/signaling to other components of the platform 2300 to indicate a current state of the EMCs 2324. Examples of the EMCs 2324 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 2300 is configured to operate one or more EMCs 2324 based on one or more captured events and/or instructions or control signals received from a service provider and/or various clients. In some implementations, the interface circuitry may connect the platform 2300 with positioning circuitry 2316. The positioning circuitry 2316 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 2316 comprises various hardware elements including hardware devices such as switches, filters, amplifiers, antenna elements, and the like to facilitate OTA communications) to communicate with components of a positioning network, such as navigation satellite constellation nodes. In some embodiments, the positioning circuitry 2316 may include a Micro-PNT IC that uses a master timing clock to perform position tracking/estimation without GNSS assistance. The positioning circuitry 2316 may also be part of, or interact with, the baseband circuitry 2304 and/or radio front end module 2306 to communicate with the nodes and components of the positioning network. The positioning circuitry 2316 may also provide position data and/or time data to the application circuitry 2302, which may use the data to synchronize operations with various infrastructure e.g., radio base stations), for turn-by-turn navigation applications, or the like.

In some implementations, the interface circuitry may connect the platform 2300 with Near-Field Communication circuitry (shown as NFC circuitry 2312). The NFC circuitry 2312 is configured to provide contactless, short-range communications based on radio frequency identification (RFID) standards, wherein magnetic field induction is used to enable communication between NFC circuitry 2312 and NFC-enabled devices external to the platform 2300 (e.g., an "NFC touchpoint"). NFC circuitry 2312 comprises an NFC controller coupled with an antenna element and a processor coupled with the NFC controller. The NFC controller may be a chip/IC providing NFC functionalities to the NFC circuitry 2312 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 2312, or initiate data transfer between the NFC circuitry 2312 and another active NFC device (e.g., a smartphone or an NFC-enabled POS terminal) that is proximate to the platform 2300.

The driver circuitry 2318 may include software and hardware elements that operate to control particular devices that are embedded in the platform 2300, attached to the platform 2300, or otherwise communicatively coupled with the platform 2300. The driver circuitry 2318 may include individual drivers allowing other components of the platform 2300 to interact with or control various input/output (I/O) devices that may be present within, or connected to, the platform 2300. For example, driver circuitry 2318 may include a display driver to control and allow access to a display device, a touchscreen driver to control and allow access to a touchscreen interface of the platform 2300, sensor drivers to obtain sensor readings of sensors 2322 and control and allow access to sensors 2322, EMC drivers to obtain actuator positions of the EMCs 2324 and/or control and allow access to the EMCs 2324, a camera driver to control and allow access to an embedded image capture device, audio drivers to control and allow access to one or more audio devices.

The power management integrated circuitry (shown as PMIC 2310) (also referred to as "power management circuitry") may manage power provided to various components of the platform 2300. In particular, with respect to the baseband circuitry 2304, the PMIC 2310 may control power-source selection, voltage scaling, battery charging, or DC-to-DC conversion. The PMTC 2310 may often be included when the platform 2300 is capable of being powered by a battery 2314, for example, when the device is included in a UE.

In some embodiments, the PMIC 2310 may control, or otherwise be part of, various power saving mechanisms of the platform 2300. For example, if the platform 2300 is in an RRC_Connected state, where it is still connected to the RAN node as it expects to receive traffic shortly, then it may enter a state known as Discontinuous Reception Mode (DRX) after a period of inactivity. During this state, the platform 2300 may power down for brief intervals of time and thus save power. If there is no data traffic activity for an extended period of time, then the platform 2300 may transition off to an RRC_Idle state, where it disconnects from the network and does not perform operations such as channel quality feedback, handover, etc. The platform 2300 goes into a very low power state and it performs paging where again it periodically wakes up to listen to the network and then powers down again. The platform 2300 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 2314 may power the platform 2300, although in some examples the platform 2300 may be mounted deployed in a fixed location, and may have a power supply coupled to an electrical grid. The battery 2314 may be a lithium ion battery, a metal-air battery, such as a zinc-air battery, an aluminum-air battery, a lithium-air battery, and the like. In some implementations, such as in V2X, applications, the battery 2314 may be a typical lead-acid automotive battery.

In some implementations, the battery 2314 may be a "smart battery," which includes or is coupled with a Battery Management System (BMS) or battery monitoring integrated circuitry. The BMS may be included in the platform 2300 to track the state of charge (SoCh) of the battery 2314. The BMS may be used to monitor other parameters of the battery 2314 to provide failure predictions, such as the state of health (SoH) and the state of function (SoF) of the battery 2314. The BMS may communicate the information of the battery 2314 to the application circuitry 2302 or other components of the platform 2300. The BMS may also include an analog-to-digital (ADC) convertor that allows the application circuitry 2302 to directly monitor the voltage of the battery 2314 or the current flow from the battery 2314. The battery parameters may be used to determine actions that the platform 2300 may perform, such as transmission frequency, network operation, sensing frequency, and the like.

A power block, or other power supply coupled to an electrical grid may be coupled with the BMS to charge the battery 2314. In some examples, the power block may be replaced with a wireless power receiver to obtain the power wirelessly, for example, through a loop antenna in the computer platform 2300. In these examples, a wireless battery charging circuit may be included in the BMS. The specific charging circuits chosen may depend on the size of the battery 2314, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 2320 includes various input/output (I/O) devices present within, or connected to, the platform 2300, and includes one or more user interfaces designed to enable user interaction with the platform 2300 and/or peripheral component interfaces designed to enable peripheral component interaction with the platform 2300. The user interface circuitry 2320 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 2300. The output device circuitry may also include speakers or other audio emitting devices, printer(s), and/or the like. In some embodiments, the sensors 2322 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 2300 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/TX may be a proprietary bus/TX, for example, used in a SoC based system. Other bus/TX systems may be included, such as an I²C interface, an SPI interface, point-to-point interfaces, and a power bus, among others.

Figure 24:
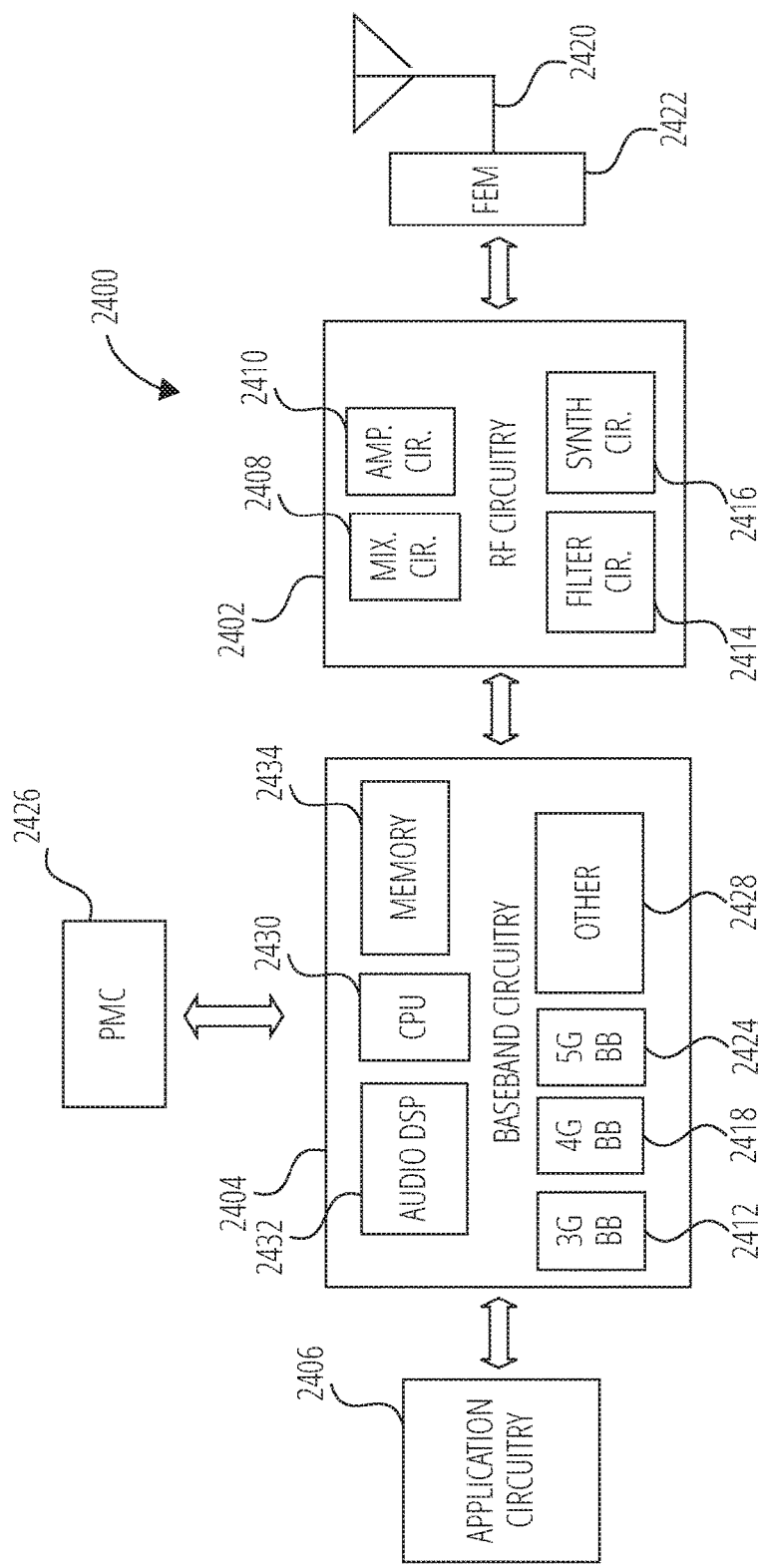
FIG. 24 illustrates a device in accordance with one embodiment.

FIG. 24 illustrates example components of a device 2400 in accordance with some embodiments. In some embodiments, the device 2400 may include application circuitry 2406, baseband circuitry 2404, Radio Frequency (RF) circuitry (shown as RF circuitry 2402), front-end module (FEM) circuitry (shown as FEM circuitry 2422), one or more antennas 2420, and power management circuitry (PMC) (shown as PMC 2426) coupled together at least as shown. The components of the illustrated device 2400 may be included in a UE or a RAN node. In some embodiments, the device 2400 may include fewer elements (e.g., a RAN node may not utilize application circuitry 2406, and instead include a processor/controller to process IP data received from an EPC). In some embodiments, the device 2400 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 2406 may include one or more application processors. For example, the application circuitry 2406 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 2400. In some embodiments, processors of application circuitry 2406 may process IP data packets received from an EPC.

The baseband circuitry 2404 may include circuitry such as, but not limited to, one or more single-core or multi-core processors. The baseband circuitry 2404 may include one or more baseband processors or control logic to process baseband signals received from a receive signal path of the RF circuitry 2402 and to generate baseband signals for a transmit signal path of the RF circuitry 2402. The baseband circuitry 2404 may interface with the application circuitry 2406 for generation and processing of the baseband signals and for controlling operations of the RF circuitry 2402. For example, in some embodiments, the baseband circuitry 2404 may include a third generation (3G) baseband processor (3G baseband processor 2412), a fourth generation (4G) baseband processor (4G baseband processor 2418), a fifth generation (5G) baseband processor (5G baseband processor 2424), or other baseband processor(s) 2428 for other existing generations, generations in development or to be developed in the future (e.g., second generation (2G), sixth generation (6G), etc.). The baseband circuitry 2404 (e.g., one or more of baseband processors) may handle various radio control functions that enable communication with one or more radio networks via the RF circuitry 2402. In other embodiments, some or all of the functionality of the illustrated baseband processors may be included in modules stored in the memory 2434 and executed via a Central Processing Unit (CPU 2430). The radio control functions may include, but are not limited to, signal modulation/demodulation, encoding/decoding, radio frequency shifting, etc. In some embodiments, modulation/demodulation circuitry of the baseband circuitry 2404 may include Fast-Fourier Transform (FFT), precoding, or constellation mapping/demapping functionality. In some embodiments, encoding/decoding circuitry of the baseband circuitry 2404 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 2404 may include a digital signal processor (DSP), such as one or more audio DSP(s) 2432. The one or more audio DSP(s) 2432 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 2404 and the application circuitry 2406 may be implemented together such as, for example, on a system on a chip (SOC).

In some embodiments, the baseband circuitry 2404 may provide for communication compatible with one or more radio technologies. For example, in some embodiments, the baseband circuitry 2404 may support communication with an evolved universal terrestrial radio access network (EUTRAN) or other wireless metropolitan area networks (WMAN), a wireless local area network (WLAN), or a wireless personal area network (WPAN). Embodiments in which the baseband circuitry 2404 is configured to support radio communications of more than one wireless protocol may be referred to as multi-mode baseband circuitry.

The RF circuitry 2402 may enable communication with wireless networks using modulated electromagnetic radiation through a non-solid medium. In various embodiments, the RF circuitry 2402 may include switches, filters, amplifiers, etc. to facilitate the communication with the wireless network. The RF circuitry 2402 may include a receive signal path which may include circuitry to down-convert RF signals received from the FEM circuitry 2422 and provide baseband signals to the baseband circuitry 2404. The RF circuitry 2402 may also include a transmit signal path which may include circuitry to up-convert baseband signals provided by the baseband circuitry 2404 and provide RF output signals to the FEM circuitry 2422 for transmission.

In some embodiments, the receive signal path of the RF circuitry 2402 may include mixer circuitry 2408, amplifier circuitry 2410 and filter circuitry 2414. In some embodiments, the transmit signal path of the RF circuitry 2402 may include filter circuitry 2414 and mixer circuitry 2408. The RF circuitry 2402 may also include synthesizer circuitry 2416 for synthesizing a frequency for use by the mixer circuitry 2408 of the receive signal path and the transmit signal path. In some embodiments, the mixer circuitry 2408 of the receive signal path may be configured to down-convert RF signals received from the FEM circuitry 2422 based on the synthesized frequency provided by synthesizer circuitry 2416. The amplifier circuitry 2410 may be configured to amplify the down-converted signals and the filter circuitry 2414 may be a low-pass filter (LPF) or band-pass filter (BPF) configured to remove unwanted signals from the down-converted signals to generate output baseband signals. Output baseband signals may be provided to the baseband circuitry 2404 for further processing. In some embodiments, the output baseband signals may be zero-frequency baseband signals, although this is not a requirement. In some embodiments, the mixer circuitry 2408 of the receive signal path may comprise passive mixers, although the scope of the embodiments is not limited in this respect.

In some embodiments, the mixer circuitry 2408 of the transmit signal path may be configured to up-convert input baseband signals based on the synthesized frequency provided by the synthesizer circuitry 2416 to generate RF output signals for the FEM circuitry 2422. The baseband signals may be provided by the baseband circuitry 2404 and may be filtered by the filter circuitry 2414.

In some embodiments, the mixer circuitry 2408 of the receive signal path and the mixer circuitry 2408 of the transmit signal path may include two or more mixers and may be arranged for quadrature downconversion and upconversion, respectively. In some embodiments, the mixer circuitry 2408 of the receive signal path and the mixer circuitry 2408 of the transmit signal path may include two or more mixers and may be arranged for image rejection (e.g., Hartley image rejection). In some embodiments, the mixer circuitry 2408 of the receive signal path and the mixer circuitry 2408 may be arranged for direct downconversion and direct upconversion, respectively. In some embodiments, the mixer circuitry 2408 of the receive signal path and the mixer circuitry 2408 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 2402 may include analog-to-digital converter (ADC) and digital-to-analog converter (DAC) circuitry and the baseband circuitry 2404 may include a digital baseband interface to communicate with the RF circuitry 2402.

In some dual-mode embodiments, a separate radio IC circuitry may be provided for processing signals for each spectrum, although the scope of the embodiments is not limited in this respect.

In some embodiments, the synthesizer circuitry 2416 may be a fractional-N synthesizer or a fractional N/N+1 synthesizer, although the scope of the embodiments is not limited in this respect as other types of frequency synthesizers may be suitable. For example, synthesizer circuitry 2416 may be a delta-sigma synthesizer, a frequency multiplier, or a synthesizer comprising a phase-locked loop with a frequency divider.

The synthesizer circuitry 2416 may be configured to synthesize an output frequency for use by the mixer circuitry 2408 of the RF circuitry 2402 based on a frequency input and a divider control input. In some embodiments, the synthesizer circuitry 2416 may be a fractional N/N+1 synthesizer.

In some embodiments, frequency input may be provided by a voltage controlled oscillator (VCO), although that is not a requirement. Divider control input may be provided by either the baseband circuitry 2404 or the application circuitry 2406 (such as an applications processor) depending on the desired output frequency. In some embodiments, a divider control input (e.g., N) may be determined from a look-up table based on a channel indicated by the application circuitry 2406.

Synthesizer circuitry 2416 of the RF circuitry 2402 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 2416 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 2402 may include an IQ/polar converter.

The FEM circuitry 2422 may include a receive signal path which may include circuitry configured to operate on RF signals received from one or more antennas 2420, amplify the received signals and provide the amplified versions of the received signals to the RF circuitry 2402 for further processing. The FEM circuitry 2422 may also include a transmit signal path which may include circuitry configured to amplify signals for transmission provided by the RF circuitry 2402 for transmission by one or more of the one or more antennas 2420. In various embodiments, the amplification through the transmit or receive signal paths may be done solely in the RF circuitry 2402, solely in the FEM circuitry 2422, or in both the RF circuitry 2402 and the FEM circuitry 2422.

In some embodiments, the FEM circuitry 2422 may include a TX/RX switch to switch between transmit mode and receive mode operation. The FEM circuitry 2422 may include a receive signal path and a transmit signal path. The receive signal path of the FEM circuitry 2422 may include an LNA to amplify received RF signals and provide the amplified received RF signals as an output (e.g., to the RF circuitry 2402). The transmit signal path of the FEM circuitry 2422 may include a power amplifier (PA) to amplify input RF signals (e.g., provided by the RF circuitry 2402), and one or more filters to generate RF signals for subsequent transmission (e.g., by one or more of the one or more antennas 2420).

In some embodiments, the PMC 2426 may manage power provided to the baseband circuitry 2404. In particular, the PMC 2426 may control power-source selection, voltage scaling, battery charging, or DC-to-DC conversion. The PMC 2426 may often be included when the device 2400 is capable of being powered by a battery, for example, when the device 2400 is included in a UE. The PMC 2426 may increase the power conversion efficiency while providing desirable implementation size and heat dissipation characteristics.

FIG. 24 shows the PMC 2426 coupled only with the baseband circuitry 2404. However, in other embodiments, the PMC 2426 may be additionally or alternatively coupled with, and perform similar power management operations for, other components such as, but not limited to, the application circuitry 2406, the RF circuitry 2402, or the FEM circuitry 2422.

In some embodiments, the PMC 2426 may control, or otherwise be part of, various power saving mechanisms of the device 2400. For example, if the device 2400 is in an RRC_Connected state, where it is still connected to the RAN node as it expects to receive traffic shortly, then it may enter a state known as Discontinuous Reception Mode (DRX) after a period of inactivity. During this state, the device 2400 may power down for brief intervals of time and thus save power.

If there is no data traffic activity for an extended period of time, then the device 2400 may transition off to an RRC_idle state, where it disconnects from the network and does not perform operations such as channel quality feedback, handover, etc. The device 2400 goes into a very low power state and it performs paging where again it periodically wakes up to listen to the network and then powers down again. The device 2400 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 2406 and processors of the baseband circuitry 2404 may be used to execute elements of one or more instances of a protocol stack. For example, processors of the baseband circuitry 2404, alone or in combination, may be used to execute Layer 3, Layer 2, or Layer 1 functionality, while processors of the application circuitry 2406 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 25:
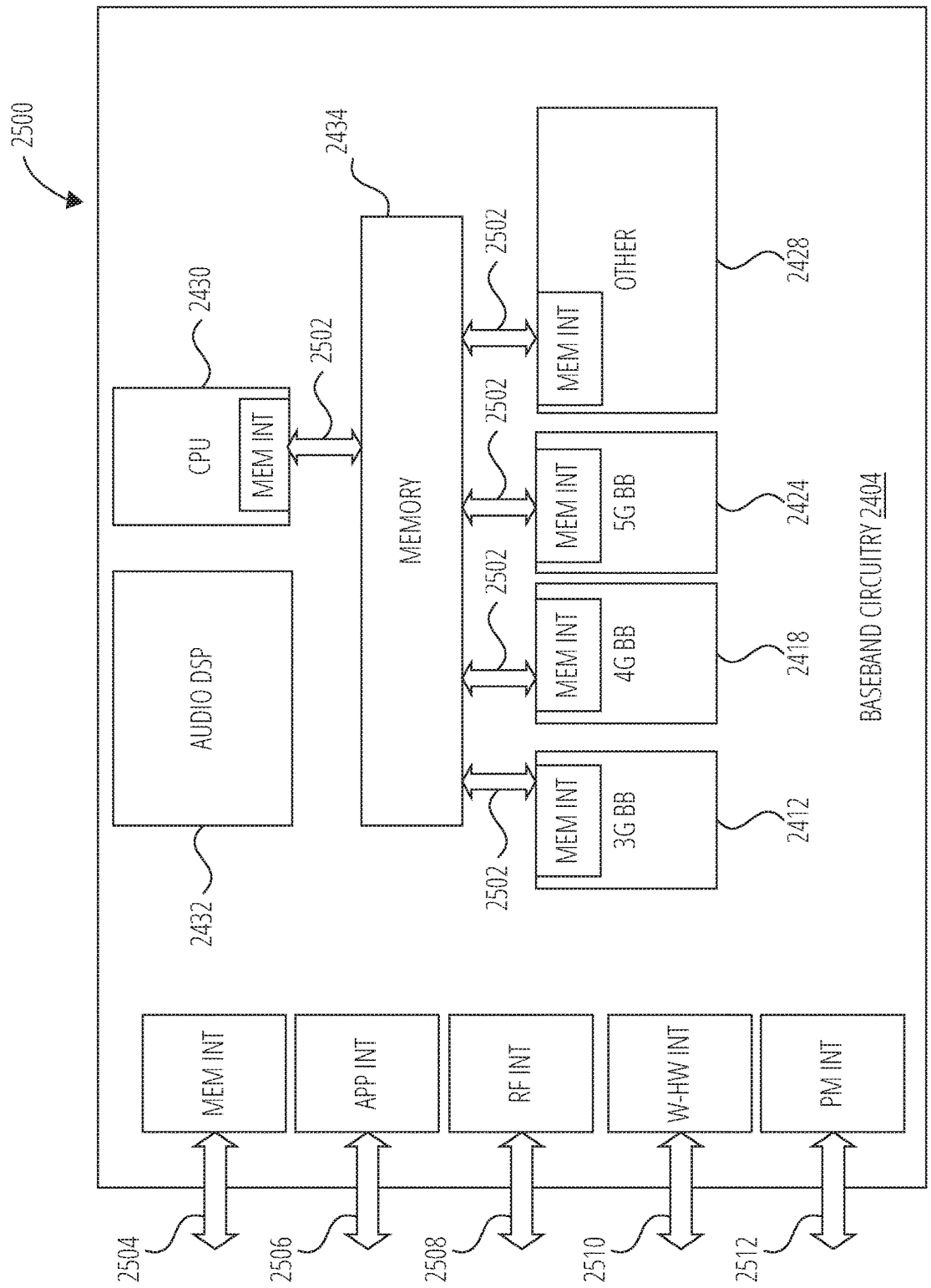
FIG. 25 illustrates example interfaces in accordance with one embodiment.

FIG. 25 illustrates example interfaces 2500 of baseband circuitry in accordance with some embodiments. As discussed above, the baseband circuitry 2404 of FIG. 24 may comprise 3G baseband processor 2412, 4G baseband processor 2418, 5G baseband processor 2424, other baseband processor(s) 2428, CPU 2430, and a memory 2434 utilized by said processors. As illustrated, each of the processors may include a respective memory interface 2502 to send/receive data to/from the memory 2434.

The baseband circuitry 2404 may further include one or more interfaces to communicatively couple to other circuitries/devices, such as a memory interface 2504 (e.g., an interface to send/receive data to/from memory external to the baseband circuitry 2404), an application circuitry interface 2506 (e.g., an interface to send/receive data to/from the application circuitry 2406 of FIG. 24), an RF circuitry interface 2508 (e.g., an interface to send/receive data to/from RF circuitry 2402 of FIG. 24), a wireless hardware connectivity interface 2510 (e.g., an interface to send/receive data to/from Near Field Communication (NFC) components, Bluetooth® components (e.g., Bluetooth® Low Energy), Wi-Fi® components, and other communication components), and a power management interface 2512 (e.g., an interface to send/receive power or control signals to/from the PMC 2426.

FIG. 26 is a block diagram illustrating components 2600, according to some example embodiments, able to read instructions from a machine-readable or computer-readable medium (e.g., a non-transitory machine-readable storage medium) and perform any one or more of the methodologies discussed herein. Specifically, FIG. 26 shows a diagrammatic representation of hardware resources 2602 including one or more processors 2606 (or processor cores), one or more memory/storage devices 2614, and one or more communication resources 2624, each of which may be communicatively coupled via a bus 2616. For embodiments where node virtualization (e.g., NFV) is utilized, a hypervisor 2622 may be executed to provide an execution environment for one or more network slices/sub-slices to utilize the hardware resources 2602.

The processors 2606 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 2608 and a processor 2610.

The memory/storage devices 2614 may include main memory, disk storage, or any suitable combination thereof. The memory/storage devices 2614 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 2624 may include interconnection or network interface components or other suitable devices to communicate with one or more peripheral devices 2604 or one or more databases 2620 via a network 2618. For example, the communication resources 2624 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 2612 may comprise software, a program, an application, an applet, an app, or other executable code for causing at least any of the processors 2606 to perform any one or more of the methodologies discussed herein. The instructions 2612 may reside, completely or partially, within at least one of the processors 2606 (e.g., within the processor's cache memory), the memory/storage devices 2614, or any suitable combination thereof. Furthermore, any portion of the instructions 2612 may be transferred to the hardware resources 2602 from any combination of the peripheral devices 2604 or the databases 2620. Accordingly, the memory of the processors 2606, the memory/storage devices 2614, the peripheral devices 2604, and the databases 2620 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a LTE, base station, network element, etc. as described above in connection with one or more of the preceding figures may be configured to operate in accordance with one or more of the examples set forth below in the example section.

EXAMPLE SECTION

The following examples pertain to further embodiments.

Example 1 is a method for wireless communications by a user equipment (UE), comprising: determining that sounding reference signal-switching (SRS-switching) is to be performed by the UE; based on determining that SRS-switching is to be performed, processing potential impacts to one or more of a plurality of radio access technologies (RATs) caused by performing SRS-switching while sharing radio frequency (RF) front-ends (RFFE) between at least a subset of the plurality of RATs, the potential impacts comprising at least one of transmit-blanking (Tx-blanking) and receive-blanking (Rx-blanking) associated with one or more of the subset of RATs; and encoding a communication that indicates the potential impacts of SRS-switching for transmission to a base station.

Example 2 is the method of Example 1, wherein the encoded communication further includes an indication of the RATs that will be affected by the potential impacts.

Example 3 is the method of Example 1, further comprising: decoding an SRS-switching report configuration received from the base station; and applying the decoded SRS-switching report configuration; and based on applying the decoded SRS-switching report configuration, generating statistics associated with the potential impacts of SRS-switching for a given time window, the generated statistics being encoded within the communication that indicates the potential impacts of SRS-switching.

Example 4 is the method of Example 3, wherein the encoded communication further includes an indication of the RATs or particular carriers that will be affected by the potential impacts.

Example 5 is the method of Example 3, wherein the encoded communication is transmitted to the base station a-periodically.

Example 6 is the method of Example 3, wherein the potential impacts further include impacts associated with SRS-skipping.

Example 7 is the method of Example 3, wherein when the generated statistics are associated with Tx-blanking, the generated statistics may include a percentage of uplink (UL) slots affected by Tx-blanking for at least one of the subset of RATs.

Example 8 is the method of Example 3, wherein when the generated statistics are associated with Rx-blanking, the generated statistics may include a percentage of downlink (DL) slots affected by Rx-blanking for at least one of the subset of RATS.

Example 9 is the method of Example 3, wherein when the generated statistics are associated with SRS-skipping, the generated statistics may include a percentage of SRS-skippings occurring during SRS-switching to avoid blanking impacts.

Example 10 is a method for wireless communications by a user equipment (UE), comprising: determining that multi-chance sounding reference signal-switching (SRS-switching) is to be performed by the UE, wherein multi-chance SRS-switching includes a plurality of SRS-switching opportunities for the UE; based on determining that SRS-switching is to be performed, processing potential impacts to one or more of a plurality of radio access technologies (RATS) caused by performing SRS-switching while sharing radio frequency (RF) front-ends (RFFE) between at least a subset of the plurality of RATs, the potential impacts comprising at least one of transmit-blanking (Tx-blanking) and receive-blanking (Rx-blanking) associated with one or more of the subset of RATs; and skipping at least a subset of the plurality of SRS-switching opportunities based on determining that the potential impacts will affect at least one of the subset of RATs during the subset of SRS-switching opportunities.

Example 11 is the method of Example 10, wherein the UE skips the subset of SRS-switching opportunities based on one or more rules associated with multi-chance SRS-switching provided by a base station.

Example 12 is the method of Example 10, wherein the UE skips the subset of SRS-switching opportunities based on a traffic priority associated with at least one RAT affected by the potential impacts from the subset of RATs.

Example 13 is the method of Example 10, wherein multi-chance SRS-switching further comprises one of: repeating SRS resources across multiple symbols or slots; and using a single downlink control information (DCI) to trigger multiple SRS resources or multiple SRS-switching opportunities.

Example 14 is a method for wireless communications by a user equipment (UE), comprising: determining that sounding reference signal-switching (SRS-switching) is to be performed by the UE, based on determining that SRS-switching is to be performed, processing potential impacts to one or more of a plurality of radio access technologies (RATs) caused by performing SRS-switching while sharing radio frequency (RE) front-ends (RETE) between at least a subset of the plurality of RATs, the potential impacts comprising at least one of transmit-blanking (Tx-blanking) and receive-blanking (Rx-blanking) associated with the subset of RATs, wherein at least one of the subset of RATs is determined to be affected by potential impacts during processing; decoding a priority for each of the plurality of RATs; adjusting the priority for the at least one RAT; and performing at least one of SRS-skipping, Tx-blanking, or Rx-blanking based on adjusting the priority for the at least one RAT.

Example 15 is the method of Example 14, wherein adjusting the priority for the at least one RAT comprises decoding an updated priority for the at least one RAT received from a base station.

Example 16 is the method of Example 15, wherein the updated priority is received via radio resource control (RRC) messaging or a medium access control (MAC) control element (MAC CE).

Example 17 is the method of Example 15, wherein the updated priority is updated by the UE based on at least one of throughput, power consumption, thermal condition, and battery condition.

Example 18 is the method of Example 17, wherein the updated priority is provided to the base station via UE assistance information (UAI).

Example 19 is the method of Example 15, wherein adjusting the priority for the at least one RAT includes the UE dynamically reporting a preferred SRS-switching priority configuration to the base station.

Example 20 is a method for wireless communications by a user equipment (UE), comprising: decoding a multiple SRS-switching configuration received from a base station, the multiple SRS-switching configuration including at least a periodic SRS-switching configuration and an a-periodic SRS-switching configuration that are each simultaneously active, wherein the periodic SRS-switching configuration has a first priority configuration associated with determining whether to perform transmit-blanking (Tx-blanking), receive-blanking (Rx-blanking), or SRS-skipping in a given scenario and the a-periodic SRS-switching configuration has a second different priority configuration associated with determining whether to perform transmit-blanking (Tx-blanking), receive-blanking (Rx-blanking), or SRS-skipping in a given scenario; based on decoding the multiple SRS-switching configuration, processing potential impacts to one or more of a plurality of radio access technologies (RATs) caused by performing SRS-switching while sharing radio frequency (RE) front-ends (RFFE) between at least a subset of the plurality of RATs, the potential impacts comprising at least one of Tx-blanking, Rx-blanking, and SRS-skipping associated with one or more of the subset of RATs; performing at least one of SRS-skipping, Tx-blanking, or Rx-blanking associated with the periodic SRS-switching configuration based on the first priority configuration and the potential impacts; and performing at least one of SRS-skipping, Tx-blanking, or Rx-blanking associated with the a-periodic SRS-switching configuration based on the second priority configuration and the potential impacts.

Example 21 is the method of Example 20, wherein the first priority configuration comprises a high priority associated with a long-term channel and the second priority configuration comprises a low priority associated with a short-term channel that can be skipped to avoid effects of Tx-blanking or Rx-blanking.

Example 22 is a method for wireless communications by a user equipment (UE), comprising: determining that sounding reference signal-switching (SRS-switching) is to be performed by the UE; based on decoding the SRS-switching condition configuration, processing potential impacts to one or more of a plurality of radio access technologies (RATs) caused by performing SRS-switching while sharing radio frequency (RE) front-ends (RFFE) between at least a subset of the plurality of RATs, the potential impacts comprising at least one of transmit-blanking (Tx-blanking), receive-blanking (Rx-blanking), and SRS-skipping associated with one or more of the subset of RATs; and decoding an SRS-skipping condition configuration received from a base station, the SRS-skipping condition configuration including one or more conditions associated with the one or more RATs and logic for skipping SRS-switching opportunities based on the one or more conditions; monitoring the one or more conditions of the one or more RATs; and skipping at least one SRS-switching opportunity associated with the one or more RATs based on the logic for skipping SRS-switching opportunities and the one or more monitored conditions of the one or more RATs.

Example 23 is the method of Example 22, wherein the one or more conditions include at least one of link quality, scheduling ratio, throughput, and traffic priority.

Example 1B may include an apparatus comprising means to perform one or more elements of a method described in or related to any of the above Examples, or any other method or process described herein.

Example 2B may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 3B may include an apparatus comprising logic, modules, or circuitry to perform one or more elements of a method described in or related to any of the above Examples, or any other method or process described herein.

Example 4B may include a method, technique, or process as described in or related to any of the above Examples, or portions or parts thereof.

Example 5B may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 6B may include a signal as described in or related to any of the above Examples, or portions or parts thereof.

Example 7B may include a datagram, packet, frame, segment, protocol data unit (PDU), or message as described in or related to any of the above Examples, or portions or parts thereof, or otherwise described in the present disclosure.

Example 8B may include a signal encoded with data as described in or related to any of the above Examples, or portions or parts thereof, or otherwise described in the present disclosure.

Example 9B may include a signal encoded with a datagram, packet, frame, segment, PDU, or message as described in or related to any of the above Examples, or portions or parts thereof, or otherwise described in the present disclosure.

Example 10B may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 11B may include a computer program comprising instructions, wherein execution of the program by a processing element is to cause the processing element to carry out the method, techniques, or process as described in or related to any of the above Examples, or portions thereof.

Example 12B may include a signal in a wireless network as shown and described herein.

Example 13B may include a method of communicating in a wireless network as shown and described herein.

Example 14B may include a system for providing wireless communication as shown and described herein.

Example 15B may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. A method for wireless communications by a user equipment (UE), comprising:
   decoding a sounding reference signal-switching (SRS-switching) report configuration received from a base station;
   determining that SRS switching is to be performed by the UE;
   based on determining that SRS-switching is to be performed, processing potential impacts to one or more of a plurality of radio access technologies (RATs) caused by performing SRS-switching and sounding reference signal-skipping (SRS-skipping) while sharing radio frequency (RF) front-ends (RFFE) between the plurality of RATs, the potential impacts comprising at least one of transmit-blanking (Tx-blanking) and receive-blanking (Rx-blanking) associated with one or more of the plurality of RATs;

applying the decoded SRS-switching report configuration;

based on applying the decoded SRS-switching report configuration, generating statistics associated with the potential impacts for a given time window; and encoding, for transmission to the base station, a communication that indicates the potential impacts and that includes an indication of one of a Long Term Evolution (LTE) RAT and Fifth Generation (5G) RAT of the plurality of RATs that will be affected by the potential impacts and that comprises the generated statistics.

2. The method of claim 1, wherein the encoded communication further indicates particular carriers that will be affected by the potential impacts.

3. The method of claim 1, wherein the encoded communication is transmitted to the base station a-periodically.

4. The method of claim 1, wherein when the generated statistics are associated with Tx-blanking, the generated statistics include a percentage of uplink (UL) slots affected by Tx-blanking for at least one of the plurality of RATs.

5. The method of claim 1, wherein when the generated statistics are associated with Rx-blanking, the generated statistics include a percentage of downlink (DL) slots affected by Rx-blanking for at least one of the plurality of RATs.

6. The method of claim 1, wherein when the generated statistics are further associated with the SRS-skipping, the generated statistics include a percentage of SRS-skippings occurring during SRS-switching to avoid blanking impacts.

7. An apparatus for wireless communications by a user equipment (UE), comprising:

a memory to store data corresponding to potential impacts of sounding reference signal-switching (SRS-switching) and sounding reference signal-skipping (SRS-skipping); and one or more processors configured to cause the UE to:
decode an SRS-switching report configuration received from a base station;
determine that SRS-switching is to be performed by the UE;
based on determining that SRS-switching is to be performed, process the data corresponding to the potential impacts to one or more of a plurality of radio access technologies (RATs) caused by performing the SRS-switching and the SRS-skipping while sharing radio frequency (RF) front-ends (RFFE) between the plurality of RATs, the data corresponding to the potential impacts comprising at least one of transmit-blanking (Tx-blanking and receive-blanking (Rx-blanking) associated with one or more of the plurality of RATs;
apply the decoded SRS-switching report configuration;
based on applying the decoded SRS-switching report configuration, generate statistics associated with the potential impacts of SRS-switching for a given time window; and
encode, for transmission to the base station, a communication that indicates the potential impacts and that includes an indication of one of a Long Term Evolution (LTE) RAT and Fifth Generation (5G) RAT of the plurality of RATs that will be affected by the potential impacts and that comprises the generated statistics.

8. The apparatus of claim 7, wherein the encoded communication further indicates particular carriers that will be affected by the potential impacts.

9. The apparatus of claim 7, wherein the encoded communication is transmitted to the base station a-periodically.

10. The apparatus of claim 7, wherein when the generated statistics are associated with Tx-blanking, the generated statistics include a percentage of uplink (UL) slots affected by Tx-blanking for at least one of the plurality of RATs.

11. The apparatus of claim 7, wherein when the generated statistics are associated with Rx-blanking, the generated statistics include a percentage of downlink (DL) slots affected by Rx-blanking for at least one of the plurality of RATs.

12. The apparatus of claim 7, wherein when the generated statistics are further associated with the SRS-skipping, the generated statistics include a percentage of SRS-skippings occurring during SRS-switching to avoid blanking impacts.

13. A non-transitory computer-readable storage medium including instructions that when executed by one or more processors of a user equipment (UE) for wireless communication, cause the UE to:

decode a sounding reference signal-switching (SRS-switching) report configuration received from a base station;

determine that SRS switching is to be performed by the UE;

based on determining that SRS-switching is to be performed, process potential impacts to one or more of a plurality of radio access technologies (RATs) caused by performing SRS-switching and sounding reference signal-skipping (SRS-skipping) while sharing radio frequency (RF) front-ends (RFFE) between the plurality of RATs, the potential impacts comprising at least one of transmit-blanking (Tx-blanking) and receive-blanking (Rx-blanking) associated with one or more of the plurality of RATs;

apply the decoded SRS-switching report configuration;

based on applying the decoded SRS-switching report configuration, generate statistics associated with the potential impacts of SRS-switching for a given time window; and encode, for transmission to the base station, a communication that indicates the potential impacts and that includes an indication of one of a Long Term Evolution (LTE) RAT and Fifth Generation (5G) RAT of the plurality of RATs that will be affected by the potential impacts and that comprises the generated statistics.

14. The non-transitory computer-readable storage medium of claim 13, wherein the encoded communication further indicates particular carriers that will be affected by the potential impacts.

15. The non-transitory computer-readable storage medium of claim 13, wherein the encoded communication is transmitted to the base station a-periodically.

16. The non-transitory computer-readable storage medium of claim 13, wherein when the generated statistics are associated with Tx-blanking, the generated statistics include a percentage of uplink (UL) slots affected by Tx-blanking for at least one of the plurality of RATs.

17. The non-transitory computer-readable storage medium of claim 13, wherein when the generated statistics are associated with Rx-blanking, the generated statistics include a percentage of downlink (DL) slots affected by Rx-blanking for at least one of the plurality of RATs.

18. The non-transitory computer-readable storage medium of claim 13, wherein when the generated statistics are further associated with the SRS-skipping, the generated statistics include a percentage of SRS-skippings occurring during SRS-switching to avoid blanking impacts.

\* \* \* \* \*